US012719800B2

(12) United States Patent
Fu et al.

(10) Patent No.: US 12,719,800 B2
(45) Date of Patent: Aug. 25, 2026

(54) COMMUNICATION METHOD FOR PROCESSING APPLICATION DATA UNIT (ADU)

(71) Applicant: GUANGDONG OPPO MOBILE TELECOMMUNICATIONS CORP., LTD., Dongguan (CN)

(72) Inventors: Zhe Fu, Dongguan (CN); Yali Guo, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/625,093

(22) Filed: Apr. 2, 2024

(65) Prior Publication Data

US 2024/0267335 A1 Aug. 8, 2024

Related U.S. Application Data

(63) Continuation of application No. PCT/CN2021/122880, filed on Oct. 9, 2021.

(51) Int. Cl.

| | |
|---|---|
| ***H04L 47/215*** | (2022.01) |
| ***H04L 47/21*** | (2022.01) |
| ***H04W 72/1268*** | (2023.01) |

(52) U.S. Cl.

CPC ............ *H04L 47/215* (2013.01); *H04L 47/21* (2013.01); *H04W 72/1268* (2013.01)

(58) Field of Classification Search

CPC ... H04L 47/215; H04L 47/21; H04W 72/1268

USPC .......................................................... 709/224

See application file for complete search history.

(56) References Cited

U.S. PATENT DOCUMENTS 10,320,705 B1 * 6/2019 Li ....................... H04L 47/2441
2005/0011365 A1 * 1/2005 Lamy ................. H04N 21/6437 99/326
2006/0083231 A1 * 4/2006 Jeffay ................... H04L 43/026 370/389
2010/0183033 A1 * 7/2010 Hannuksela .......... H04L 65/756 370/476
2012/0147936 A1 * 6/2012 Rangan ................... H04L 1/188 709/217

(Continued)

FOREIGN PATENT DOCUMENTS

CN 106412794 A 2/2017
CN 108633088 A 10/2018

(Continued)

OTHER PUBLICATIONS

3GPP TS 38.321 V16.5.0 (Jun. 2021) , 3rd Generation Partnership Project;Technical Specification Group Radio Access Network;NR;Medium Access Control (MAC) protocol specification(Release 16).

(Continued)

*Primary Examiner* — Nicholas R Taylor
(74) *Attorney, Agent, or Firm* — Ladas & Parry, LLP

(57) ABSTRACT

A communication method is disclosed. The method is performed by a terminal device. The method includes transmitting first indication information to a network device. The first indication information comprises Application Data Unit (ADU) association information.

16 Claims, 3 Drawing Sheets

Terminal device

Network device

S41: transmitting a first uplink grant resource to a terminal device.

S42: receiving the first uplink grant resource from the network device.

S43: performing a processing operation according to ADU association information and the first uplink grant resource.

(56) References Cited

U.S. PATENT DOCUMENTS

| | | | | |
|---|---|---|---|---|
| 2012/0170469 | A1 | 7/2012 | Curcio et al. | |
| 2015/0280845 | A1 | 10/2015 | Ballakur et al. | |
| 2019/0059127 | A1* | 2/2019 | Fan | H04W 72/21 |
| 2021/0105086 | A1* | 4/2021 | Lou | H04W 72/23 |
| 2021/0314977 | A1* | 10/2021 | Xu | H04W 72/23 |
| 2021/0400533 | A1* | 12/2021 | Kwok | H04W 72/1268 |
| 2022/0014959 | A1* | 1/2022 | Wu | H04W 56/001 |
| 2024/0259871 | A1* | 8/2024 | Wang | H04W 72/231 |

FOREIGN PATENT DOCUMENTS

| | | | |
|---|---|---|---|
| CN | 108702595 | A | 10/2018 |
| WO | 2023056638 | A1 | 4/2023 |

OTHER PUBLICATIONS

International Search Report of International Patent Application No. PCT/CN2021/122880, mailed May 26, 2022, with English translation provided by WIPO.

Written Opinion of the International Searching Authority in International Patent Application No. PCT/CN2021/122880, mailed May 26, 2022, with partial translation provided by applicant's foreign counsel and machine translation provided by WIPO.

* cited by examiner

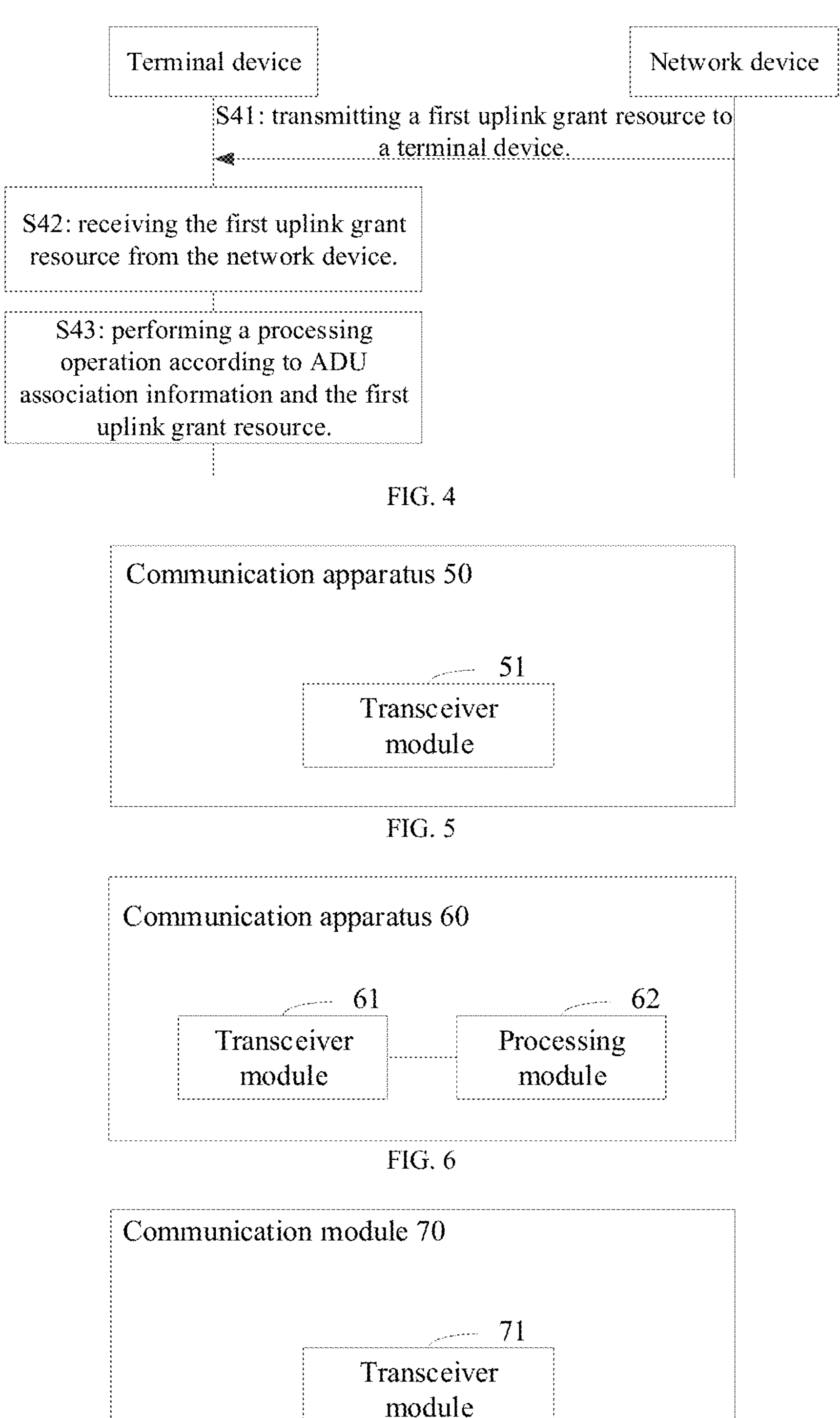
Terminal device
Network device
S41: transmitting a first uplink grant resource to a terminal device.
S42: receiving the first uplink grant resource from the network device.
S43: performing a processing operation according to ADU association information and the first uplink grant resource.
FIG. 4
Communication apparatus 50
51
Transceiver module
FIG. 5
Communication apparatus 60
61
Transceiver module
62
Processing module
FIG. 6
Communication module 70
71
Transceiver module
FIG. 7

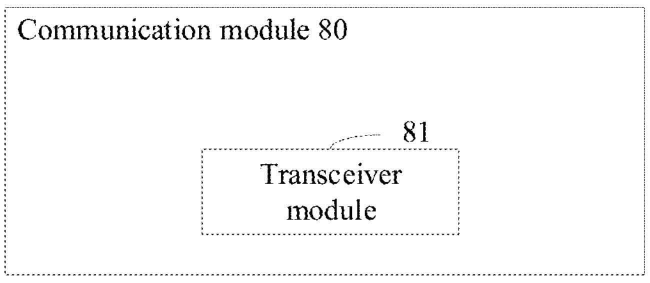
FIG. 8
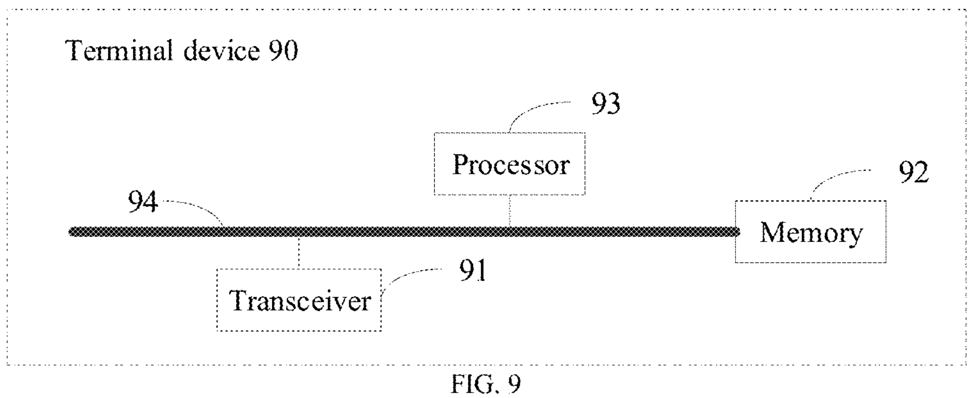
FIG. 9
Network device 100
103
Processor
102
104
Memory
Transceiver
101
FIG. 10

COMMUNICATION METHOD FOR PROCESSING APPLICATION DATA UNIT (ADU)

CROSS-REFERENCE TO RELATED APPLICATIONS

The present disclosure is a continuation application of International (PCT) Patent Application No. PCT/CN2021/122880, filed on Oct. 9, 2021, the contents of which are hereby incorporated by reference in their entirety.

TECHNICAL FIELD

The present disclosure relates to the field of communication technologies, and in particular to a communication method.

BACKGROUND

During data transmission, application layer data interacted between a terminal device and a counterpart (including an application server or another terminal device) is usually processed after specific encoding and compression, i.e., Application Data Unit (ADU).

In some cases, two ADUs in an application layer may have a certain correlation therebetween. When an ADU is successfully transmitted and its associated ADU does not arrive, the successfully transmitted ADU may not be correctly decoded.

SUMMARY OF THE DISCLOSURE

Embodiments of the present disclosure provide a communication method.

In a first aspect, the present disclosure provides a communication method, performed by a terminal device and comprising:

transmitting first indication information to a network device; wherein the first indication information comprises Application Data Unit (ADU) association information.

In a second aspect, the present disclosure provides a communication method, performed by a terminal device and comprising:

receiving a first uplink grant resource from a network device; and performing a processing operation according to Application Data Unit (ADU) association information and the first uplink grant resource.

In a third aspect, the present disclosure provides a communication method, performed by a network device and comprising:

transmitting a first uplink grant resource to a terminal device.

BRIEF DESCRIPTION OF THE DRAWINGS

FIG. 4 is a signaling view II of a communication method according to some embodiments of the present disclosure.

FIG. 5 is a structural schematic view I of a communication apparatus according to some embodiments of the present disclosure.

FIG. 6 is a structural schematic view II of a communication apparatus according to some embodiments of the present disclosure.

FIG. 7 is a structural schematic view III of a communication apparatus according to some embodiments of the present disclosure.

FIG. 8 is a structural schematic view IV of a communication apparatus according to some embodiments of the present disclosure.

FIG. 9 is a structural schematic view of a terminal device according to some embodiments of the present disclosure.

FIG. 10 is a structural schematic view of a network device according to some embodiments of the present disclosure.

DETAILED DESCRIPTION

Figure 1:
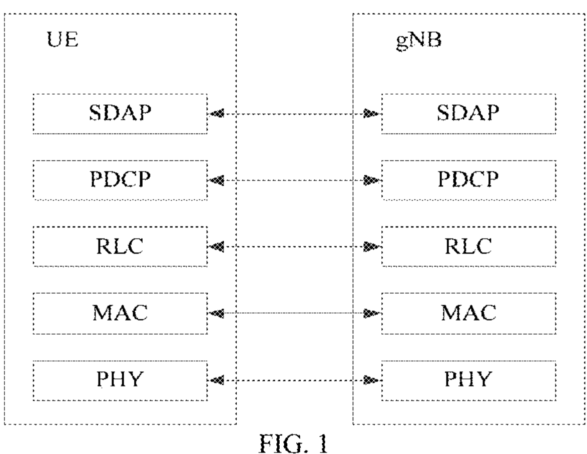
FIG. 1 is a schematic view of a user-plane protocol stack.

In order to better understand the technical solution of the present disclosure, the relevant concepts and related technologies involved in the present disclosure are described below.

Terminal device, which may be a device having a wireless transceiver function and being capable of cooperating with a network device to provide a communication service for a user. Specifically, the terminal device may refer to a User Equipment (UE), an access terminal, a user unit, a user station, a mobile station, a mobile platform, a remote station, a remote terminal, a mobile device, a user terminal, a terminal, a wireless communication apparatus, a user agent, or a user apparatus. For example, the terminal device may be a cellular telephone, a cordless telephone, a Session Initiation Protocol (SIP) telephone, a Wireless Local Loop (WLL) station, a Personal Digital Assistant (PDA), a handheld device with wireless communication capabilities, a computing device or other processing devices connected to a wireless modem, an in-vehicle device, a wearable device, a terminal device in a future 5G network or a future evolved Public Land Mobile Network (PLMN) after 5G, etc., without limitation herein.

As an example, and not as a limitation, in the embodiments of the present disclosure, the terminal device may be a wearable device. The wearable device, which may also be referred to as a wearable smart device, is a general term for applying wearable technology to intelligently design and develop devices that can be worn for daily wear, such as glasses, gloves, watches, apparel, and shoes. The wearable device is a portable device that can be worn directly on a human body or integrated into clothing or accessories. The wearable device is not only a hardware device, but also can realize powerful functions through software support as well as data interaction and cloud interaction. Broadly speaking, the wearable smart device includes full-featured, large-sized devices that do not rely on a smartphone to achieve complete or partial functionality, such as a smart watch or smart glasses, etc.; and devices that focus only on a certain type of application function and are required to be used in conjunction with other devices such as a smartphone, such as various types of smart bracelets and smart jewelry for monitoring physical signs.

In addition, in the embodiments of the present disclosure, the terminal device may be a terminal device in an Internet of Things (IoT) system. The IoT system is an important part of the development of information technology in the future, of which the main technological feature is to connect items to a network through communication technology, thereby realizing an intelligent network capable of human-computer interconnection and thing-thing interconnection. In the embodiments of the present disclosure, the IoT technology may be applied to achieve massive connectivity, deep coverage, and terminal power saving through, for example, Narrow Band (NB) technology.

Network device, which may be a device configured to communicate with a terminal device, for example, a Base Transceiver Station (BTS) in a Global System for Mobile Communication (GSM) or Code Division Multiple Access (CDMA) communication system, or a base station (NodeB, NB) in a Wideband Code Division Multiple Access (WCDMA) system, or an evolutional Node B (eNB or eNode B) in an LTE system. The network device may be a relay station, an access point, an in-vehicle device, a wearable device, a network-side device in a future 5G network or a network after 5G, or a network device in a future evolved Public Land Mobile Network (PLMN) network, etc.

The network device involved in the embodiments of the present disclosure may be referred to as a Radio Access Network (RAN) device, which is connected to a terminal device for receiving data from the terminal device and transmitting the data to a core network device. The RAN device corresponds to different devices in different communication systems, e.g., base station and base station controller in 2G system, base station and Radio Network Controller (RNC) in 3G system, Evolutional Node B (eNB) in 4G system, and access network device (e.g., gNB, Centralized Unit (CU), and Distributed Unit (DU)) in 5G system, such as New Radio (NR).

A user-plane protocol stack is described below with the accompanying drawings. The user-plane refers to a protocol stack and related processes for transmitting UE data. Corresponding to the user-plane is a control-plane, which refers to a protocol stack and related processes for transmitting control signaling. FIG. 1 is a schematic view of a user-plane protocol stack. As shown in FIG. 1, the NR user-plane protocol stack includes a Service Data Adaptation Protocol (SDAP) layer, a Packet Data Convergence Protocol (PDCP) layer, a Radio Link Control (RLC) layer, a Medium Access Control (MAC) layer, and a physical (PHY) layer.

The SDAP layer is a new protocol layer added to the 5G NR user-plane with respect to LTE, and is mainly responsible for a mapping between Quality of Service (QoS) flow and Data Radio Bearer (DRB). The PDCP layer is responsible for encryption/decryption, integrity protection, header compression, maintenance of sequence numbers, reordering, and sequential delivery, etc. The RLC layer is responsible for RLC Service Data Unit (SDU) packet cutting, reorganization, error detection, etc. The MAC layer is responsible for a mapping between logical channels and transmission channels, multiplexing and demultiplexing, uplink and downlink scheduling-related processes, and random-access processes.

In a process of data processing at the user-plane, data at the user-plane reaches the SDAP layer through QoS flow, and the SDAP layer maps the data of different QoS flows to different DRBs, adds an identification of QoS flow to the data according to a network configuration, and generates a SDAP Packet Data Unit (PDU) and submits it to the PDCP layer. The PDCP layer processes the SDAP PDU to generate a PDCP PDU and submits it to the RLC layer. The RLC layer performs RLC SDU processing and the like according to a configured RLC model.

In the following, a scenario to which the communication method of the present disclosure applies is described in connection with FIG. 2.

Figure 2:
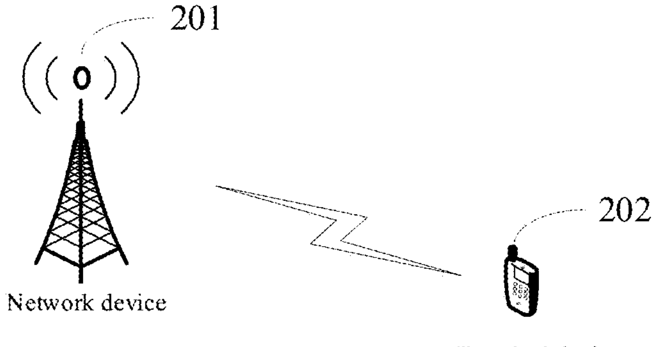
FIG. 2 is a schematic view of a communication scenario according to some embodiments of the present disclosure.

FIG. 2 is a schematic view of a communication scenario according to some embodiments of the present disclosure. Referring to FIG. 2, the communication scenario includes a network device 201 and a terminal device 202, and the network device 201 and the terminal device 202 may communicate wirelessly with each other. The terminal device 202 may communicate with at least one core network through a Radio Access Network (RAN).

The communication system may be a Global System of Mobile Communication (GSM) system, a Code Division Multiple Access (CDMA) system, a Wideband Code Division Multiple Access (WCDMA) system, a Long Term Evolution (LTE) system, or 5th Generation (5G) system.

Accordingly, the network device may be a Base Transceiver Station (BTS) in a GSM system or a CDMA system, a base station (NodeB, NB) in a WCDMA system, an Evolved NodeB (eNB), Access Point (AP), or relay station in an LTE system, a base station in a 5G system, etc., without limitation herein.

The 5G mobile communication system described in the present disclosure includes a non-standalone (NSA) 5G mobile communication system and/or a standalone (SA) 5G mobile communication system. The technical solutions provided in the present disclosure may further be applied to future communication systems, such as sixth generation mobile communication systems. The communication system may further be a PLMN network, a device-to-device (D2D) network, a machine-to-machine (M2M) network, an IoT network, or other networks.

It is to be understood that when the technical solutions of the embodiments of the present disclosure are applied in other wireless communication networks, the corresponding names may be replaced with the names of the corresponding functions in the other wireless communication networks. The network architecture as well as the service scenarios described in the embodiments of the present disclosure are for the purpose of more clearly illustrating the technical solutions of the embodiments of the present disclosure, and do not constitute a limitation on the technical solutions provided in the embodiments of the present disclosure. It is known to those skilled in the art that, with the evolution of the network architecture and the emergence of new service scenarios, the technical solutions provided in the embodiments of the present disclosure are equally applicable to similar technical problems.

On the basis of the above-described introductory contents, the relevant technical background of the present disclosure is described below.

In the future, the support of 3GPP systems for vertical industries will become more and more extensive and in-depth. For example, Ultra-reliable and Low Latency Communications (URLLC) requirements may support services such as factory automation, transport industry, electrical power distribution, etc. in 5GPP. XR requirements may support the transmission of augmented reality (AR), virtual reality (VR), and cloud gaming (CG) services. These services generally have reliability and delay requirements, because they have to meet the QoS requirements for data transmission when scheduling resources for the UE. In terms of UE, requirements of UE power consumption are further required to be met to avoid unnecessary power consumption. In addition, considering the large number of UE accesses supporting the services, the network capacity is required to be ensured during resource allocation.

Typically, for URLLC and XR, they are required to support services with the requirement of a minimum of 0.5 ms and 99.999% reliability. The service may be pseudo-cyclic (indicating that a deviation (jitter) exists in service arrival time), i.e., the service will not arrive at a definite point, but at any moment within a range. The service period may be a non-integer period, e.g., 16.67 ms. In addition, the arrival time of different service streams for a same service may vary significantly (e.g., for AR, the UL pose has a period of 4 ms, but the UL video has a period of 16.67 ms).

For the services of AR, VR, and CG, possible service models are as follows:

VR: uplink pose information+downlink video stream; CG: uplink control information+downlink video stream; AR: uplink pose information and control information (UL (pose information+UL video stream))+downlink video stream. Among them, the control information or pose information has a period of roughly 4 ms and a packet size requirement of roughly 100 bytes; the video stream has a period of roughly 16.67 ms and a packet size requirement of roughly 0.67 Mbps.

Typically, each service is a pseudo-cyclic service. That is, the service arrives in cycles, while a jitter exists for time points that the service arrives in each cycle, i.e., the service arrives within a time range. In particular, in cases of AR, for UL, there is pose information and video information in one cycle, and the two streams arrive at different times with different packet sizes.

During data transmission, application layer data interacted between the UE and the application server or between the UE and a peer UE is usually processed by specific encoding and compression, i.e., an Application Data Unit (ADU). For example, the application data unit may be a frame, or a coded slice. For example, the application layer data is encoded and compressed using the commonly used H.264 video codec technology standard, where the H.264 standard formats data through a Network Abstraction Layer (NAL) and provides header information of the application layer data. In the process of encoding, part of the video frame sequence is compressed into I frames, part of the video frame sequence is compressed into P frames, and part of the video frame sequence is compressed into B frames; among them, the I frame is a key frame, which belongs to intra-frame compression, and decoding may be accomplished with only the data of the present frame; the P frame and B frame do not have complete picture data, but only data of a difference of the picture in a neighboring frame, and decoding requires the picture of the neighboring frame to be overlaid on the difference of the frame defined in the present frame to generate the final picture.

Same as LTE, in NR, the network allocates uplink transmission resources based on each UE instead of each per-bearer, and it is up to the UE to decide which per-bearer's data can be transmitted in the allocated uplink transmission resources. Based on the uplink transmission resources configured by the network, the UE is required to decide the amount of to-be-transmitted data in each logical channel in an Medium Access Control Packet Data Unit (MAC PDU) initially transmitted. In some cases, the UE further allocates resources for a MAC Control Element (MAC CE). In order to realize multiplexing of uplink Logical Channels (LCH), a priority is required to be assigned to each uplink logical channel. For a MAC PDU of a given size, when there are multiple uplink logical channels having a data transmission requirement at the same time, the resources of the MAC PDU are allocated in an order of the logical channel priority corresponding to each uplink logical channel, from the highest to the lowest. In addition, in order to take into account the fairness among different logical channels, a probability of Prioritized Bit Rate (PBR) is introduced, and when the UE carries out logical channel multiplexing, it is necessary to ensure a minimum data rate requirement of each logical channel, so as to avoid a situation where the other uplink logical channels with lower priority of the UE are "starved" because the uplink logical channels with higher priority always occupy the uplink resources allocated to the UE by the network.

To realize the multiplexing of uplink logical channels, the network configures the following parameters for each uplink logical channel through the Radio Resource Control (RRC): logical channel priority, the less the value of the priority, the higher the priority of the corresponding logical channel; PBR, which indicates a minimum rate required to be ensured for the logical channels; bucket duration (bucketSizeDuration, BSD), which determines the depth of a token bucket.

The MAC of the UE uses the token bucket mechanism to realize uplink logical channel multiplexing. The UE maintains a variable Bj for each uplink logical channel j, which indicates the number of tokens currently available in the token bucket. Specifically, the UE initializes Bj to 0 when establishing the logical channel j. The UE increases Bj by PBR*T before each Logical Channel Priority (LCP) procedure, where T is a time interval between the moment of the last increase of Bj and the current moment. When Bj after being updated in accordance with the above steps is greater than a maximum token bucket capacity (i.e., PBR*BSD), Bj is set to the maximum capacity of the token bucket.

When the UE receives an uplink grant resource (UL grant) indicating a new transmission, the UE performs logical channel priority process according to the following steps:

S1: For all logical channels with Bj>0, resources are allocated in the order of priority from highest to lowest, and the resources allocated for each logical channel can only meet the requirements of the PBR, i.e., resources are allocated for a logical channel based on the number of tokens in the corresponding PBR token bucket of the logical channel. When the PBR of a logical channel is set to infinity, another logical channel with a lower priority than this logical channel will be considered only when the resources of this logical channel are met.

S2: The size of all MAC SDUs that the logical channel j multiplexes to MAC PDUs in S1 is subtracted from Bj.

S3: When there are remaining uplink resources after performing S1 and S2, the remaining resources are allocated to each logical channel in the order of logical channel priority from highest to lowest, regardless of the size of Bj. Only when the data of the high-priority logical channels have been transmitted and the UL grant has not been exhausted, the low-priority logical channels can be served. That is, the UE maximizes the data transmission of the high-priority logical channels.

In addition, the UE should further follow the following principles: when the whole RLC SDU can be filled with the remaining resources, the RLC SDU should not be segmented; when the UE segments the RLC SDU in the logical channel, it should try to fill in a largest segment according to the size of the remaining resources; the UE should maximize the data transmission; when the size of the UL grant is greater than or equal to 8 bytes and the UE has a need for data transmission, the UE shall not transmit only a padding Buffer Status Report (paddingBSR) or only a padding.

For different signals and/or logical channels, the UE is further required to follow the following priority order for logical channel priority process (in the order of priority from highest to lowest): Cell Radio Network Temporary Identity (C-RNTI) MAC CE or date from Uplink Common Control Channel (UL-CCCH); configured grant confirmation MAC CE; BSR MAC CE for use except padding BSR; single entry Power Headroom Reporting (PHR) MAC CE or multiple entry PHR MAC CE; data from any logical channel except UL-CCCH; MAC CE for recommended bit rate query; BSR MAC CE for padding BSR.

In some cases, two ADUs at the application layer may have certain association relationships with each other. For example, an audio data and another video or image data, or a video frame and its corresponding subtitle, are required to be played at the same time in order to meet the user-side viewing requirements; for another example, a B-frame data is required to arrive with its associated former and latter frames before, to be decoded correctly. If a data frame is successfully transmitted to the UE, and its associated frames do not arrive, problems may occur such as unsynchronized audio and video playback, decoding failure, etc., which may have a relatively large impact on the user experience. Based on above, the embodiments of the present disclosure provide a communication method to solve problems such as unsynchronized audio and video playback or data decoding failure due to the associated ADUs of the application layer not being synchronized for processing.

Figure 3:
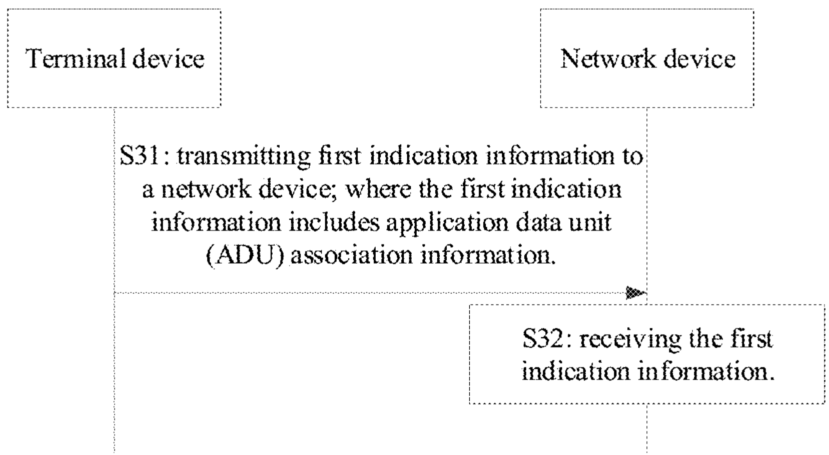
FIG. 3 is a signaling view I of a communication method according to some embodiments of the present disclosure.

Referring to FIG. 3, FIG. 3 is a signaling view I of a communication method according to some embodiments of the present disclosure, which includes the following operations.

S31: transmitting, by a terminal device, first indication information to a network device; where the first indication information includes Application Data Unit (ADU) association information.

In some cases, two or more ADUs of the application layer may have certain association relationships with each other. For example, an audio data and another video data or image data are required to be played at the same time in order to meet the user-side viewing requirements, a video frame data and a corresponding subtitle are required to be played at the same time in order to meet the user-side viewing requirements, and a B-frame data is required to arrive by both former and latter frame data associated with the B-frame data in order to be decode correctly, etc.

When two or more ADUs of the application layer have a certain association relationship with each other, in order to enable the associated ADUs to be processed in a synchronized manner, the terminal device may transmit the first indication information to the network device, the first indication information includes the ADU association information, and an ADU association indication is reported to the network device through the ADU association information.

S32, receiving, by the network device, the first indication information from the terminal device.

After receiving the first indication information, the network device obtains the ADU association information in the first indication information, thereby being informed of which ADUs have an association relationship with each other. The network device may process accordingly according to the associated ADUs. For example, the network device may perform synchronization processing for the associated ADUs according to the association relationship between the ADUs.

In the communication method provided by the embodiments of the present disclosure, the terminal device transmits first indication information to the network device, and the first indication information includes an ADU association information; the network device, after receiving the first indication information, obtains the ADU association information according to the first indication information, so as to be able to be informed of the ADU association relationship, which contributes to the synchronized processing of associated ADUs, thereby realizing the overall service transmission requirements.

Before the terminal device transmits the first indication information to the network device, an application layer of the terminal device may indicate ADU associations to an access layer (or, Access Stratum (AS)) of the terminal device. For example, the application layer indicates to the access layer which ADUs are associated with each other. When associated ADUs exist, the terminal device causes the associated ADUs to reach the access layer together. For example, the application layer may buffer the associated ADUs. For example, after buffering the associated ADUs until all of the associated ADUs have arrived, the application layer issues the associated ADUs to the access layer. When associated ADUs exist, an upper layer, which may be, for example, an AS upper layer, buffers the associated ADUs. After buffering the associated ADUs until all of the associated ADUs have arrived, the upper layer issues the associated ADUs to the access layer, and the upper layer may, for example, be an AS upper layer. In some embodiments, the upper layer of the terminal device includes an ADU association indication in a packet header of the upper layer. The ADU association indication is configured to indicate to a lower layer whether an ADU association exists and/or the amount of to-be-transmitted data for the associated ADU. The upper layer may for example be an AS upper layer, and the low layer may for example be an AS lower layer. The upper layer may for example include an SDAP layer, a PDCP layer, etc., and the low layer may for example include an RLC layer, a PDCP layer, or a MAC layer, etc. In some embodiments, the terminal device may determine which PDUs or SDUs correspond to ADUs that are associated or determine which PDUs or SDUs are associated, according to interlayer interactions or upper packet headers (e.g., SDAP packet header, PDCP packet header).

When the terminal device requests resources from the network device, the terminal device may carry the first indication information, the first indication information including the ADU association information. In some embodiments, the terminal device may transmit the first indication information to the network device when associated ADUs exist, or may transmit the first indication information to the network device when a trigger condition is met. The trigger condition may include at least one of a token bucket overflow, a token bucket overflow of an LCH corresponding to the ADUs, a token bucket overflow of an LCH group corresponding to the ADUs, a token bucket overflow of an LCH set corresponding to the ADUs, and the size of data amount of the associated ADUs being less than a size of the token bucket. The LCH corresponding to the associated ADUs may be the same LCH or may be different LCHs. The token bucket overflow refers to an overflow of the token bucket of at least one LCH corresponding to the associated ADUs. The token bucket overflow of the LCH corresponding to the ADUs refers to an overflow of the token bucket of at least one LCH corresponding to the associated ADUs, where the LCH corresponding to the associated ADUs may be one or more than one. The token bucket overflow of an LCH group corresponding to the ADUs refers to an overflow of the token bucket of at least one LCH in the LCH group corresponding to the associated ADUs, where the LCH group corresponding to the ADUs includes one or more LCHs. The token bucket overflow of an LCH set corresponding to the ADUs refers to an overflow of the token bucket of at least one LCH in the LCH set corresponding to the associated ADUs, where the LCH set corresponding to the ADUs includes one or more LCHs. In the above embodiments, possible trigger conditions are described, and the trigger condition may include one or more of the above. When the terminal device transmits the first indication information to the network device when the trigger condition is met, in a case where the trigger condition includes multiple items, the terminal device may be considered to meet the trigger condition when the terminal device meets all of the items in the trigger condition, or the terminal device may be considered to meet the trigger condition when the terminal device meets at least one item in the trigger condition.

When the terminal device transmits the first indication information to the network device, the first indication information may be carried in a first RRC message, i.e., the first indication information is included in the first RRC message, and the network device receives the first RRC message from the terminal device and obtains the first indication information according to the first RRC message. The first indication information may be carried in a first MAC CE, i.e., the first MAC CE includes the first indication information, and the network device receives the first MAC CE from the terminal device and obtains the first indication information according to the first MAC CE. The first indication information may be carried in a first layer signaling, i.e., the first layer signaling includes the first indication information, and the network device receives the first layer signaling from the terminal device and obtains the first indication information according to the first layer signaling.

When the first indication information is carried in the first MAC CE, the first MAC CE may be a BSR MAC CE or a new MAC CE, the new MAC CE being a MAC CE different from the BSR MAC CE. The priority of the new MAC CE may be higher than the priority of the BSR MAC CE, may be equal to the priority of the BSR MAC CE, and may be lower than the priority of the BSR MAC CE's priority. In some embodiments, the priority of the new MAC CE is not lower than the priority of the BSR MAC CE, e.g., the priority of the new MAC CE is the same as the priority of the BSR MAC CE, or, the priority of the new MAC CE is higher than the priority of the BSR MAC CE.

The ADU association information is configured to report the ADU association indication to the network device. The ADU association information may include at least one of an indication of ADU association, the size of data amount of ADU association, an indication of token bucket overflow, an association identifier and/or an association number. The indication of ADU association is configured to indicate which ADUs are associated, and the network device may be informed of which ADUs have an association relationship and are required to be processed with synchronizing based on the indication of the ADU association. The size of data amount of ADU association is configured to indicate to the network device the size of the data amount of the associated ADUs, and the network device may allocate uplink grant resources for the terminal device based on the size of data amount of ADU association. For example, after obtaining the size of the data amount of the associated ADUs, the network device may allocate uplink grant resources for the terminal device based on the size of the data amount of the associated ADUs to meet the overall transmission of the associated ADUs. The indication of token bucket overflow is configured regarding a token bucket overflow of a LCH or LCH group or a LCH set corresponding to the associated ADUs. The token bucket overflow indicates that there are enough tokens in the LCH or LCH group or the LCH set corresponding to the associated ADUs to meet a traffic requirement for the transmission of the associated ADUs. The association identifier and association number are configured to indicate which ADUs are associated, where each associated ADU has a related association identifier or association number, and the network device may be informed of which ADUs are associated based on the association identifier or association number.

The ADU association information may have a corresponding granularity. For example, the ADU association information may be an ADU association information of an LCH, and one LCH corresponds to one ADU association information; the ADU association information may be an ADU association information of an LCH pair, and one LCH pair corresponds to one ADU association information; the ADU association information may be an ADU association information of a DRB, and one DRB corresponds to one ADU association information; the ADU association information may be an ADU association information of an LCH group, and one LCH group corresponds to one ADU association information; the ADU association information may be an ADU association information of a terminal device, and one terminal device corresponds to one ADU association information.

The ADU association information may be configured to indicate ADU associations from an application layer to an access layer. The ADU association information is configured to buffer the associated ADUs at the application layer. The ADU association information is configured to issue the associated ADUs to the access layer after buffering the associated ADUs at the application layer. The ADU association information is configured to buffer the associated ADUs at an upper layer and to issue the associated ADUs to a lower layer. The ADU association information is configured to be indicated from an upper layer to a lower layer. In the above embodiments, the upper layer may include at least one of an SDAP layer and a PDCP layer. For example, the upper layer may be an AS upper layer and the lower layer may be an AS low layer.

After the network device receives the first indication information and obtains the ADU association information, the network device may transmit a first uplink grant resource to the terminal device, and the terminal device may receive the first uplink grant resource, where the number of the first uplink grant resource may be one or more. The first uplink grant resource may or may not meet the overall transmission of the associated ADUs. The first uplink grant resource meeting the overall transmission of the associated ADUs may indicate that the size of the first uplink grant resource is greater than or equal to the size of the data amount of associated ADUs, in which case the terminal device may transmit data of the associated ADUs to the network device according to the first uplink grant resource. The first uplink grant resource meeting the overall transmission of the associated ADUs may indicate that the first uplink grant resource meets the overall transmission of the associated ADUs in terms of a transmission delay and/or a bit error rate, that is, the terminal device is able to meet the requirements for overall transmission in terms of the transmission delay and/or bit error rate when transmitting the associated ADUs to the network device according to the first uplink grant resource, to ensure synchronized processing of the associated ADU. The first uplink grant resource meeting the overall transmission of the associated ADUs may indicate that at least one first uplink grant resource meets the overall transmission of the associated ADUs in terms of the transmission delay and/or bit error rate, that is, the terminal device is able to meet the requirements for overall transmission in terms of the transmission delay and/or bit error rate when transmitting the associated ADUs to the network device according to the at least one first uplink grant resource, to ensure synchronized processing of the associated ADUs. In this way, when the network device allocates uplink grant resources to the terminal device, the network device may allocate only one uplink grant resource, or may allocate multiple uplink grant resources. The terminal device may perform an LCP procedure and/or Generate a MAC PDU according to the one or more uplink grant resources allocated by the network device.

The operation of performing LCP procedure may include performing a first LCP procedure, and/or, modifying or adjusting the LCP procedure, such that the associated ADUs are included in the allocated first uplink grant resource. The performing the first LCP procedure, and/or, modifying or adjusting the LCP procedure may be a temporary modification, where the original LCP procedure is subsequently reverted to; or, it may be a modification, where the new LCP procedure is continued to use. Specifically, a priority of an LCH corresponding to the associated ADUs may be modified or adjusted, or, a priority of an LCH group corresponding to the associated ADUs may be modified or adjusted, or, a priority of an LCH set corresponding to the associated ADUs may be modified or adjusted. In some embodiments, after performing the LCP procedure, the priority of the LCH corresponding to the associated ADU is higher than a priority corresponding to data of a packet or a Qos flow.

The generating a MAC PDU may include using a first MAC PDU generating rule, and/or, modifying or adjusting the MAC PDU generating rule, such that the associated ADUs are included in the allocated first uplink grant resource. Specifically, the size of the token bucket of an LCH corresponding to the associated ADUs may be modified or adjusted, the size of the token bucket of an LCH group corresponding to the associated ADUs may be modified or adjusted, the size of the token bucket of an LCH set corresponding to the associated ADUs may be modified or adjusted, the associated ADUs may be prioritized for multiplexing, the associated ADUs may be prioritized to be placed in the MAC PDU, etc. In some embodiments, after generating the MAC PDU, the size of the token bucket of the LCH corresponding to the associated ADUs is greater than or equal to the size of the data amount of the associated ADUs, or, the size of the token bucket of the LCH group corresponding to the associated ADUs is greater than or equal to the size of the data amount of the associated ADUs, or, the size of the token bucket of the LCH set corresponding to the associated ADUs is greater than or equal to the size of the data amount of the associated ADUs.

In the communication method provided by embodiments of the present disclosure, the terminal device transmits first indication information to the network device, and the first indication information includes an ADU association information; after receiving the first indication information, the network device obtains the ADU association information according to the first indication information, so as to be able to be informed of the ADU association relationship, which contributes to the synchronized processing of the associated ADUs and realizes the overall service transmission requirements.

Referring to FIG. 4, FIG. 4 is a signaling view II of a communication method according to some embodiments of the present disclosure, which includes the following operations.

S41: transmitting, by a network device, a first uplink grant resource to a terminal device.

The network device may transmit the first uplink grant resource to the terminal device, and the first uplink grant resource is a new transmission resource, i.e., the first uplink grant resource is configured for an initial transmission between the terminal device and the network device, and not for a retransmission between the terminal device and the network device.

S42: receiving, by the terminal device, the first uplink grant resource from the network device.

S43: performing, by the terminal device, a processing operation according to an ADU association information and the first uplink grant resource.

After receiving the first uplink grant resource, the terminal device may perform a processing operation according to the ADU association information and the first uplink grant resource. For example, the terminal device may perform an LCP procedure, packet deletion, generating a MAC PDU, transmitting data to the network device, transmitting with the network device, etc., according to the ADU association information and the first uplink grant resource. The ADU association information is configured to indicate associated ADUs.

The first uplink grant resource may or may not meet the overall transmission of the associated ADUs. In the following embodiments, the first uplink grant resource meeting the overall transmission of the associated ADUs indicates at least one of the following: the size of the first uplink grant resource is greater than or equal to the size of the data amount of associated ADUs; the first uplink grant resource meets the overall transmission of the associated ADUs in terms of a transmission delay and/or a bit error rate; at least one first uplink grant resource meets the overall transmission of the associated ADUs in terms of transmission delay and/or bit error rate. The first uplink grant resource not meeting the overall transmission of the associated ADUs indicates at least one of the following: the size of the first uplink grant resource is less than the size of the data amount of associated ADUs; the first uplink grant resource does not meet the overall transmission of the associated ADUs in terms of a transmission delay and/or a bit error rate; at least one first uplink grant resource does not meet the overall transmission of the associated ADUs in terms of transmission delay and/or bit error rate.

The ADU association information is configured to report the ADU association indication to the network device. The ADU association information may include at least one of an indication of ADU association, the size of data amount of ADU association, an indication of token bucket overflow, an association identifier and/or an association number. The indication of ADU association is configured to indicate which ADUs are associated, and the network device may be informed of which ADUs have an association relationship and are required to be processed with synchronizing based on the indication of the ADU association. The size of data amount of ADU association is configured to indicate to the network device the size of the data amount of the associated ADUs, and the network device may allocate uplink grant resources for the terminal device based on the size of data amount of ADU association. For example, after obtaining the size of the data amount of the associated ADUs, the network device may allocate uplink grant resources for the terminal device based on the size of the data amount of the associated ADUs to meet the overall transmission of the associated ADUs. The indication of token bucket overflow is configured regarding a token bucket overflow of a LCH or LCH group or a LCH set corresponding to the associated ADUs. The token bucket overflow indicates that there are enough tokens in the LCH or LCH group or the LCH set corresponding to the associated ADUs to meet a traffic requirement for the transmission of the associated ADUs. The association identifier and association number are configured to indicate which ADUs are associated, where each associated ADU has a related association identifier or association number, and the network device may be informed of which ADUs are associated based on the association identifier or association number.

The ADU association information may have a corresponding granularity. For example, the ADU association information may be ADU association information of an LCH, and one LCH corresponds to one ADU association information; the ADU association information may be ADU association information of an LCH pair, and one LCH pair corresponds to one ADU association information; the ADU association information may be ADU association information of a DRB, and one DRB corresponds to one ADU association information; the ADU association information may be ADU association information of an LCH group, and one LCH group corresponds to one ADU association information; the ADU association information may be ADU association information of a terminal device, and one terminal device corresponds to one ADU association information.

In some embodiments, before the network device transmits the first uplink grant resource to the terminal device, the terminal device transmits first indication information to the network device, the first indication information including the ADU association information. In some embodiments, the terminal device may transmit the first indication information to the network device when an associated ADU exists, or may transmit the first indication information to the network device when a trigger condition is met. The trigger condition may include at least one of a token bucket overflow, a token bucket overflow of an LCH corresponding to the ADUs, a token bucket overflow of an LCH group corresponding to the ADUs, a token bucket overflow of an LCH set corresponding to the ADUs, and the size of data amount of the associated ADUs being less than a size of the token bucket. The LCH corresponding to the associated ADUs may be the same LCH or may be different LCHs. The token bucket overflow refers to an overflow of the token bucket of at least one LCH corresponding to the associated ADUs. The token bucket overflow of the LCH corresponding to the ADUs refers to an overflow of the token bucket of at least one LCH corresponding to the associated ADUs, where the LCH corresponding to the associated ADUs may be one, or may be more than one. The token bucket overflow of an LCH group corresponding to an ADU refers to an overflow of the token bucket of at least one LCH in the LCH group corresponding to the associated ADUs, where the LCH group corresponding to the ADUs includes one or more LCHs. The token bucket overflow of an LCH set corresponding to ADUs refers to an overflow of the token bucket of at least one LCH in the LCH set corresponding to the associated ADUs, where the LCH set corresponding to the ADUs includes one or more LCHs. In the above embodiments, possible trigger conditions are described, and the trigger conditions may include one or more of the above. When the terminal device transmits the first indication information to the network device when the trigger condition is met, in a case where the trigger condition includes multiple items, the terminal device may be considered to meet the trigger condition when the terminal device meets all of the items in the trigger condition, or the terminal device may be considered to meet the trigger condition when the terminal device meets at least one item in the trigger condition.

Before the terminal device transmits the first indication information to the network device, an application layer of the terminal device may indicate ADU associations to an access layer of the terminal device. For example, the application layer indicates to the access layer which ADUs are associated with each other. When associated ADUs exist, the terminal device causes the associated ADUs to arrive together at the access layer. For example, the application layer may buffer the associated ADUs. For example, the application layer issues the associated ADUs to the access layer after buffering the associated ADUs until all of the associated ADUs have arrived. When associated ADUs are present, an upper layer buffers the associated ADUs. The upper layer issues the associated ADUs to the access layer after buffering the associated ADUs until all of the associated ADUs have arrived. In some embodiments, the upper layer of the terminal device includes an ADU association indication in a packet header of the upper layer. The ADU association indication is configured to indicate to a lower layer whether an ADU association exists and/or the amount of to-be-transmitted data for the associated ADUs. The upper layer may, for example, include an SDAP layer, a PDCP layer, etc., and the lower layer may, for example, include an RLC layer, a PDCP layer, or a MAC layer, etc. In some embodiments, the terminal device may determine which PDUs or SDUs correspond to ADU that are associated or determine which PDUs or SDUs are associated, according to inter-layer interactions or upper packet header (e.g., SDAP packet header, PDCP packet header).

When the terminal device transmits the first indication information to the network device, the first indication information may be carried in a first RRC message, i.e., the first indication information is included in the first RRC message, and the network device receives the first RRC message from the terminal device and obtains the first indication information according to the first RRC message. The first indication information may be carried in a first MAC CE, i.e., the first MAC CE includes the first indication information, and the network device receives the first MAC CE from the terminal device and obtains the first indication information according to the first MAC CE. The first indication information may be carried in a first layer signaling, i.e., the first layer signaling includes the first indication information, and the network device receives the first layer signaling from the terminal device and obtains the first indication information according to the first layer signaling.

When the first indication information is carried in the first MAC CE, the first MAC CE may be a BSR MAC CE or a new MAC CE, the new MAC CE being a MAC CE different from the BSR MAC CE. The priority of the new MAC CE may be higher than the priority of the BSR MAC CE, may be equal to the priority of the BSR MAC CE, and may be lower than the priority of the BSR MAC CE. In some embodiments, the priority of the new MAC CE is not lower than the priority of the BSR MAC CE, e.g., the priority of the new MAC CE is the same as the priority of the BSR MAC CE, or, the priority of the new MAC CE is higher than the priority of the BSR MAC CE.

The ADU association information may be configured to indicate ADU associations from an application layer to an access layer. The ADU association information is configured to buffer the associated ADUs at the application layer. The ADU association information is configured to issue the associated ADUs to the access layer after buffering the associated ADUs at the application layer. The ADU association information is configured to buffer the associated ADUs at an upper layer and to issue the associated ADUs to a lower layer. The ADU association information is configured to be indicated from an upper layer to a lower layer. In the above embodiments, the upper layer may include at least one of an SDAP layer and a PDCP layer.

After the network device receives the first indication information and obtains the ADU association information, the network device may transmit a first uplink grant resource to the terminal device, and the terminal device may receive the first uplink grant resource, where the number of the first uplink grant resource may be one or more. The first uplink grant resource may or may not meet the overall transmission of the associated ADUs. The first uplink grant resource meeting the overall transmission of the associated ADUs may indicate that the size of the first uplink grant resource is greater than or equal to the size of the data amount of associated ADUs, in which case the terminal device may transmit data of the associated ADUs to the network device based on the first uplink grant resource. The first uplink grant resource meeting the overall transmission of the associated ADUs may indicate that the first uplink grant resource meets the overall transmission of the associated ADUs in terms of a transmission delay and/or a bit error rate, that is, the terminal device is able to meet the requirements for overall transmission in terms of transmission delay and/or bit error rate to ensure synchronized processing of the associated ADU when transmitting the associated ADUs to the network device according to the first uplink grant resource. The first uplink grant resource meeting the overall transmission of the associated ADUs may indicate that at least one first uplink grant resource meets the overall transmission of the associated ADUs in terms of transmission delay and/or bit error rate, that is, the terminal device is able to meet the requirements for overall transmission in terms of transmission delay and/or bit error rate to ensure synchronized processing of the associated ADU when transmitting the associated ADUs to the network device according to the at least one first uplink grant resource, to ensure synchronized processing of the associated ADUs. In this way, when the network device allocates uplink grant resources to the terminal device, the network device may allocate only one uplink grant resource, or may allocate multiple uplink grant resources. The terminal device may perform an LCP procedure and/or generating a MAC PDU according to the one or more uplink grant resources allocated by the network device, in which case the processing operation of the terminal device includes performing LCP procedure and/or generating a MAC PDU. In some embodiments, the first uplink grant resource meets the overall transmission of the associated ADUs.

The operation of performing LCP procedure may include performing a first LCP procedure, and/or, modifying or adjusting the LCP procedure, such that the associated ADUs are included in the allocated first uplink grant resource. The performing the first LCP procedure, and/or, modifying or adjusting the LCP procedure may be a temporary modification, where the original LCP procedure is subsequently reverted to; or, it may be a modification, where the new LCP procedure is continued to use. Specifically, a priority of an LCH corresponding to the associated ADUs may be modified or adjusted, or, a priority of an LCH group corresponding to the associated ADUs may be modified or adjusted, or, a priority of an LCH set corresponding to the associated ADU may be modified or adjusted. In some embodiments, after performing the LCP procedure, the priority of the LCH corresponding to the associated ADU is higher than a priority corresponding to data of a packet or a Qos flow.

The generating a MAC PDU may include using a first MAC PDU generating rule, and/or, modifying or adjusting the MAC PDU generating rule, such that the associated ADUs are included in the allocated first uplink grant resource. Specifically, the size of the token bucket of an LCH corresponding to the associated ADUs may be modified or adjusted, the size of the token bucket of an LCH group corresponding to the associated ADUs may be modified or adjusted, the size of the token bucket of an LCH set corresponding to the associated ADUs may be modified or adjusted, the associated ADUs may be prioritized for multiplexing, the associated ADUs may be prioritized to be placed in the MAC PDU, etc. In some embodiments, after the generating a MAC PDU, the size of the token bucket of the LCH corresponding to the associated ADUs is greater than or equal to the size of the data amount of the associated ADUs, or, the size of the token bucket of the LCH group corresponding to the associated ADUs is greater than or equal to the size of the data amount of the associated ADUs, or, the size of the token bucket of the LCH set corresponding to the associated ADUs is greater than or equal to the size of the data amount of the associated ADUs.

In the scheme of embodiments of the present disclosure, the terminal device reports an ADU association indication to the network device by transmitting first indication information to the network device, the first indication information including an ADU association information, thereby enabling synchronized processing of the associated ADUs.

In some embodiments, the processing operation of the terminal device may include generating a MAC PDU and/or transmitting data to the network device. The entity performing the processing operation may be the PDCP layer or SDAP layer of the terminal device, and in some embodiments, the entity performing the processing operation is the PDCP layer. Specifically, the generating a MAC PDU includes, for example, the terminal device generates a PDU according to the ADU association information, e.g., generating PDUs corresponding to the packets. In some embodiments, the generated PDUs include the ADU association information, and the ADU association information is configured to indicate the associated ADUs. The ADU association information may be specifically included in packet headers of the PDUs, or, the ADU association information may be included in the packet headers of the PDCP PDU packets. The ADU association information may be configured to indicate a lower layer ADU association, or, associated ADUs. The ADU association information may further be configured for a MAC layer to process the associated ADUs.

The application layer of the terminal device may indicate the ADU associations to the access layer of the terminal device. For example, the application layer indicates to the access layer which ADUs are associated with each other. When associated ADUs exist, the terminal device causes the associated ADUs to reach the access layer together. For example, the application layer may buffer the associated ADUs. For example, after buffering the associated ADUs until all of the associated ADUs have arrived, the application layer issues the associated ADUs to the access layer. When associated ADUs exist, an upper layer buffers the associated ADUs. After buffering the associated ADUs until all of the associated ADUs have arrived, the upper layer issues the associated ADUs to the access layer. In some embodiments, the upper layer of the terminal device includes an ADU association indication in a packet header of the upper layer. The ADU association indication is configured to indicate to a lower layer whether an ADU association exists and/or the amount of to-be-transmitted data for the associated ADU. The upper layer may for example include an SDAP layer, a PDCP layer, etc., and the low layer may for example include an RLC layer, a PDCP layer, or a MAC layer, etc. In some embodiments, the terminal device may determine which PDUs or SDUs correspond to ADUs that are associated or determine which PDUs or SDUs are associated, according to interlayer interactions or upper packet headers (e.g., SDAP packet header, PDCP packet header). In some embodiments, the first uplink grant resource meets the overall transmission of the associated ADUs.

In some embodiments, the terminal device may transmit data to the network device according to the first uplink grant resource, and the network device may receive the data from the terminal device, the data including data corresponding to the associated ADUs. Specifically, the network device may receive the data in such a way that a receiving end buffers the arriving ADUs according to the ADU association information. After the associated ADUs arrive at the receiving end or are received by the receiving end, the associated ADUs are submitted to the upper layer. In some embodiments, the receiving end may be a PDCP layer of the network device.

In the scheme of embodiments of the present disclosure, when receiving data, the receiving end buffers the ADUs that arrive first according to the ADU association information, and does not submit the associated ADUs to the upper layer until the associated ADUs arrive at the receiving end or are received by the receiving end, thereby being able to meet the delay requirement and the synchronization processing requirement for the transmission of the associated ADUs.

In some embodiments, the processing operation of the terminal device may include transmitting with the network device. Specifically, the transmitting with the network device may include transmitting a second indication information to the network device. For example, after receiving the first uplink grant resource, the terminal device determines whether to transmit the second indication information to the network device according to the ADU association information. In some embodiments, the first uplink grant resource does not meet the overall transmission of the associated ADUs.

In some embodiments, the terminal device may transmit the second indication information to the network device, or may transmit the second indication information to the network device when a first condition is met. The first condition may include at least one of the following: the size of the first uplink grant resource is less than the size of an associated packet, in which case the first uplink grant resource does not meet the overall transmission of the associated ADUs; the MAC PDU does not include all the data of the associated packet, i.e., the associated ADUs are not in the MAC PDU, in which case the uplink grant resource may be the first uplink grant resource or may be a currently available uplink grant resource; the MAC PDU does not include remaining data or to-be-transmitted data of the associated packet, and the associated ADUs do not meet a transmission delay requirement or a Packet Delay Budget (PDB) requirement; the size of the first uplink grant resource is less than the size of a token bucket corresponding to the associated ADUs; the size of the first uplink grant resource is less than the size of a token bucket corresponding to the LCH of the associated ADU; the size of the first uplink grant resource is less than the size of a token bucket corresponding to the LCH pair of the associated ADU; and the size of the first uplink grant resource is less than the size of a token bucket corresponding to the LCH group of the associated ADU. In the above embodiments, possible first conditions are described, and the first condition may include one or more of the above. When the terminal device transmits the second indication information to the network device when the first condition is met, in a case where the first condition includes multiple items, the terminal device may be considered to meet the first condition when the terminal device meets all of the items in the first condition, or the terminal device may be considered to meet the first condition when the terminal device meets at least one item in the first condition.

The application layer of the terminal device may indicate ADU associations to the access layer of the terminal device. For example, the application layer indicates to the access layer which ADUs are associated with each other. When associated ADUs exist, the terminal device causes the associated ADUs to arrive together at the access layer. For example, the application layer may buffer the associated ADUs. For example, the application layer issues the associated ADUs to the access layer after buffering the associated ADUs until all of the associated ADUs have arrived. When associated ADUs are present, an upper layer buffers the associated ADUs. The upper layer issues the associated ADUs to the access layer after buffering the associated ADUs until all of the associated ADUs have arrived. In some embodiments, the upper layer of the terminal device includes an ADU association indication in a packet header of the upper layer. The ADU association indication is configured to indicate to a lower layer whether an ADU association exists and/or the amount of to-be-transmitted data for the associated ADUs. The upper layer may, for example, include an SDAP layer, a PDCP layer, etc., and the lower layer may, for example, include an RLC layer, a PDCP layer, or a MAC layer, etc. In some embodiments, the terminal device may determine which PDUs or SDUs correspond to ADU that are associated or determine which PDUs or SDUs are associated, according to inter-layer interactions or upper packet header (e.g., SDAP packet header, PDCP packet header).

When the terminal device transmits the second indication information to the network device, the second indication information may be carried in the first uplink grant resource. That is, when the terminal device transmits with the network device according to the first uplink grant resource, the second indication information is transmitted to the network device. The second indication information may be carried in a second RRC message, i.e., the second RRC message includes the second indication information, and the network device receives the second RRC message from the terminal device and obtains the second indication information according to the second RRC message. The second indication information may be carried in a second MAC CE, i.e., the second MAC CE includes the second indication information, and the network device receives the second MAC CE from the terminal device and obtains the second indication information according to the second MAC CE. The second indication information may be carried in a second layer signaling, i.e., the second indication information is included in the second layer signaling, and the network device receives the second layer signaling from the terminal device and obtains the second indication information according to the second layer signaling.

When the second indication information is carried in the second MAC CE, the second MAC CE may be a BSR MAC CE or a new MAC CE, the new MAC CE being a MAC CE different from the BSR MAC CE. The priority of the new MAC CE may be higher than the priority of the BSR MAC CE, may be equal to the priority of the BSR MAC CE, and may be lower than the priority of the BSR MAC CE. In some embodiments, the priority of the new MAC CE is not lower than the priority of the BSR MAC CE, e.g., the priority of the new MAC CE is the same as the priority of the BSR MAC CE, or the priority of the new MAC CE is higher than the priority of the BSR MAC CE.

The second indication information may have a different granularity. For example, the second indication information may be a second indication information of an LCH, and one LCH corresponds to one second indication information; the second indication information may be a second indication information of an LCH pair, and one LCH pair corresponds to one second indication information; the second indication information may be a second indication information of a DRB, and one DRB corresponds to one second indication information; the second indication information may be a second indication information of an LCH group, and one LCH group corresponds to one second indication information; the second indication information may be a second indication information of a terminal device, and one terminal device corresponds to one second indication information.

In some embodiments, the network device may further transmit a second uplink grant resource to the terminal device, to ensure the transmission of the associated ADUs. The terminal device may receive the second uplink grant resource, and the number of the second uplink grant resources may be one or more. The second uplink grant resource may or may not meet the overall transmission of the associated ADUs. The second uplink grant resource meeting the overall transmission of the associated ADUs may indicate that the size of the second uplink grant resources is greater than or equal to the size of the data amount of the associated ADUs, in which case the terminal device may transmit data of the associated ADUs to the network device according to the second uplink grant resources. The second uplink grant resource meeting the overall transmission of the associated ADUs may indicate that the second uplink grant resources meet the overall transmission of the associated ADUs in terms of a transmission delay and/or a bit error rate, that is, the terminal device is able to meet the requirements for overall transmission in terms of the transmission delay and/or bit error rate when transmitting the associated ADUs to the network device according to the second uplink grant resource, to ensure synchronized processing of the associated ADUs. The second uplink grant resource meeting the overall transmission of the associated ADUs may indicate that at least one second uplink grant resource meets the overall transmission of the associated ADUs in terms of the transmission delay and/or bit error rate, that is, the terminal device is able to meet the requirements for overall transmission in terms of transmission delay and/or bit error rate when transmitting the associated ADUs according to the at least one second uplink grant resource, to ensure synchronized processing of the associated ADUs. In this way, when the network device allocates uplink grant resources to the terminal device, the network device may allocate only one uplink grant resource or multiple uplink grant resources.

In the scheme of the embodiments of the present disclosure, in order to reduce the problem of wastage of uplink grant resources when a part of the ADU transmissions cannot meet the overall transmission of the associated ADUs, the network device is informed that the first uplink grant resource does not meet the overall transmission of the associated ADUs by transmitting the second indication information to the network device. Further, the network device may transmit the second uplink grant resource to the network device according to the second indication information to meet the overall transmission of the associated ADUs, including the delay and association processing of the associated ADUs.

In some embodiments, the processing operation of the terminal device may include at least one of performing an LCP procedure, generating a MAC PDU, and transmitting with the network device. The performing LCP procedure may include performing a second LCP procedure, and/or, modifying or adjusting the LCP procedure. Specifically, a priority of an LCH or LCH group or LCH pair of the associated ADUs may be lowered, or, a PBR of the LCH or LCH group or LCH pair of the associated ADUs may be lowered. The generating a MAC PDU may include using a second MAC PDU generating rule, and/or, modifying or adjusting the MAC PDU generating rule. Specifically, the MAC PDU may be caused to exclude the data of the associated ADUs, or, a currently available token number Bj of the LCH or LCH group or LCH pair corresponding to the associated ADUs may be set or modified, or, the LCH or LCH group or LCH pair corresponding to the associated ADUs may not issue the PDUs corresponding to the associated ADUs. In setting or modifying Bj, the Bj may be set or modified to be 0, the Bj may be set or modified to be (Bj—the size of the associated packet), the Bj may be set or modified to be (Bj—the size of amount of to-be-transmitted data of the associated packet), etc.

In some embodiments, the first uplink grant resource does not meet the overall transmission of the associated ADUs. When part of the ADU transmission does not guarantee the overall transmission of the associated ADUs, a waste of uplink grant resources may be caused. In this case, by performing the second LCP procedure, and/or, modifying or adjusting the LCP procedure, it is possible to lower the priority of the LCH or LCH group or LCH pair of the associated ADUs, or lower the PBR of the LCH or LCH group or LCH pair of the associated ADUs, thereby prioritizing the transmission of other ADUs and transmitting the associated ADUs when there are excess uplink grant resources. By using the second MAC PDU generating rule, and/or, modifying or adjusting the MAC PDU generating rule, the currently available token number Bj of the LCH or the LCH group or the LCH pair corresponding to the associated ADUs decreases, or the LCH or the LCH group or the LCH pair corresponding to the associated ADUs does not issue the PDUs of the associated ADUs, such that the prioritized transmission of the other ADUs is also ensured.

In some embodiments, the terminal device performs LCP procedure and/or generates a MAC PDU when a second condition is met; i.e., performs a second LCP procedure, and/or, modifies or adjusts the LCP procedure, or, uses a second MAC PDU generating rule, and/or, modifies or adjusts the MAC PDU generating rule. The second condition may include at least one of the following: the size of the first uplink grant resource is less than the size of an associated packet; the MAC PDU does not include all the data of the associated packet; the MAC PDU does not include remaining data or to-be-transmitted data of the associated packet; the MAC PDU does not include the remaining data or the to-be-transmitted data of the associated packet, and the associated ADUs do not meet a transmission delay or a PDB requirement.

The terminal device may further transmit a generated MAC PDU to the network device. The MAC PDU may include a third indication information. In some embodiments, the third indication information is carried on a MAC CE or a PUSCH. In some embodiments, when the third indication information is carried on the PUSCH, the third indication information may be carried in an L1 message (L1 being the physical layer) or an RRC message. The third indication information may indicate at least one of the following: the associated ADUs do not meet the transmission requirement; the associated resource or ADUs is not transmitted; the size of the associated resource or the size of ADUs; and the size of the amount of to-be-transmitted data of the associated resource or the size of the amount of to-be-transmitted data of ADUs.

When the first uplink grant resource does not meet the overall transmission of the associated ADUs, the network device may transmit a third uplink grant resource to the terminal device to meet the overall transmission of the associated ADUs. The terminal device may receive the third uplink grant resource, and the number of the third uplink grant resources may be one or more. The third uplink grant resource may or may not meet the overall transmission of the associated ADUs. The third uplink grant resource meeting the overall transmission of the associated ADUs may indicate that the size of the third uplink grant resources is greater than or equal to the size of the data amount of associated ADUs, in which case the terminal device may transmit data of the associated ADUs to the network device according to the third uplink grant resource. The third uplink grant resource meeting the overall transmission of the associated ADUs may indicate that the third uplink grant resource meets the overall transmission of the associated ADUs in terms of a transmission delay and/or a bit error rate, that is, the terminal device is able to meet the requirements for overall transmission in terms of the transmission delay and/or bit error rate when transmitting the associated ADUs to the network device according to the third uplink grant resource, to ensure synchronized processing of the associated ADUs. The third uplink grant resource meeting the overall transmission of the associated ADUs may indicate that at least one third uplink grant resource meets the overall transmission of the associated ADUs in terms of the transmission delay and/or bit error rate, that is, the terminal device is able to meet the requirements for overall transmission in terms of the transmission delay and/or bit error rate when transmitting the associated ADUs to the network device according to the at least one third uplink grant resource, to ensure synchronized processing of the associated ADUs. In this way, when the network device allocates uplink grant resources to the terminal device, the network device may allocate only one uplink grant resource or multiple uplink grant resources.

Regarding the problem of wastage of uplink grant resources caused when the transmission of some ADUs does not guarantee the overall transmission of the associated ADUs, the scheme of the embodiments of the present disclosure may reduce the wastage of the uplink grant resources by performing the LCP procedure and/or the generating a MAC PDU in order to preferentially guarantee the transmission of the ADUs other than the associated ADUs. Further, uplink grant resources may again be requested from the network device for overall transmission of the associated ADUs.

In some embodiments, the processing operation of the terminal device may include performing a packet deletion. The packet deletion may include deleting the data of the associated ADUs, deleting the SDUs corresponding to the to-be-transmitted data, and deleting the PDUs corresponding to the to-be-transmitted data. Specifically, the MAC layer of the terminal device may instruct an upper layer to perform the packet deletion; for example, the MAC layer instructs the upper layer to delete the data of the associated ADUs, to delete the SDUs corresponding to the to-be-transmitted data, and to delete the PDUs corresponding to the to-be-transmitted data. In some embodiments, the upper layer may be at least one of a PDCP layer and an RLC layer.

In some embodiments, the packet deletion is performed when the terminal device meets a second condition. The second condition may include at least one of the following: the size of the first uplink grant resource is less than the size of an associated packet; the MAC PDU does not include all the data of the associated packet; the MAC PDU does not include remaining data or to-be-transmitted data of the associated packet; the MAC PDU does not include the remaining data or the to-be-transmitted data of the associated packet, and the associated ADUs do not meet a transmission delay or a PDB requirement.

After the terminal device performs the packet deletion, the terminal device may indicate an associated ADU packet deletion to the network device for subsequent resource scheduling or adjustment by the network device. For example, the terminal device may transmit a fourth indication information to the network device, and the fourth indication information is configured to indicate an associated ADU packet deletion to the network device. Specifically, the fourth indication information may indicate at least one of the following: the associated ADUs are deleted; the associated ADUs do not meet the transmission requirement; the associated ADUs or the associated resource of the associated ADUs are not transmitted; a size of the associated ADUs or a size of the associated resource of the associated ADUs; and the size of the amount of to-be-transmitted data of the associated ADUs. In some embodiments, the fourth indication information may be carried in a MAC CE or a PUSCH. In some embodiments, the first uplink grant resource does not meet the overall transmission of the associated ADUs.

The scheme of embodiments of the present disclosure reduces the waste of uplink grant resources by performing packet deletion when some ADU transmissions do not meet the overall transmission of the associated ADUs.

Embodiment I

When a terminal device requests resources from a network device, the terminal device carries first indication information, and the first indication information includes an ADU association information.

In some embodiments, the terminal device transmits the first indication information to the network device when a trigger condition is met. In some embodiments, the terminal device does not transmit the first indication information to the network device when the trigger condition is not met. The trigger condition includes one or more of the following: a token bucket overflow, a token bucket overflow of an LCH corresponding to an ADU, a token bucket overflow of an LCH group corresponding to an ADU, a token bucket overflow of an LCH set corresponding to an ADU, and the size of data amount of associated ADUs being less than a size of a token bucket.

In some embodiments, the ADU association information includes at least one of the following: an indication of ADU association, the size of data amount of ADU association, an indication of token bucket overflow, an association identifier and/or an association number.

In some embodiments, the ADU association information may have a corresponding granularity. The ADU association information may be an ADU association information of an LCH, an ADU association information of an LCH pair, an ADU association information of a DRB, an ADU association information of an LCH group, and an ADU association information of the terminal device.

In some embodiments, the first indication information may be carried in a first RRC message, or a first MAC CE, or a first layer signaling.

When the first indication information is carried in the first MAC CE, in some embodiments, the first MAC CE may be a BSR MAC CE or anew MAC CE. The priority of the BSR MAC CE may be higher than, equal to, or lower than the priority of the new MAC CE. In some embodiments, the priority of the new MAC CE is not lower than the priority of the BSR MAC CE.

Before the terminal device transmits the first indication information to the network device, an application layer of the terminal device may indicate ADU associations to an access layer of the terminal device. For example, the application layer indicates to the access layer which ADUs are associated with each other. When associated ADUs exist, the terminal device causes the associated ADUs to reach the access layer together. For example, the application layer may buffer the associated ADUs. For example, after buffering the associated ADUs until all of the associated ADUs have arrived, the application layer issues the associated ADUs to the access layer. When associated ADUs exist, an upper layer, which may be, for example, an AS upper layer, buffers the associated ADUs. After buffering the associated ADUs until all of the associated ADUs have arrived, the upper layer issues the associated ADUs to the access layer, and the upper layer may, for example, be an AS upper layer. In some embodiments, the upper layer of the terminal device includes an ADU association indication in a packet header of the upper layer. The ADU association indication is configured to indicate to a lower layer whether an ADU association exists and/or the amount of to-be-transmitted data for the associated ADU. The upper layer may for example be an AS upper layer, and the low layer may for example be an AS lower layer. The upper layer may for example include an SDAP layer, a PDCP layer, etc., and the low layer may for example include an RLC layer, a PDCP layer, or a MAC layer, etc. In some embodiments, the terminal device may determine which PDUs or SDUs correspond to ADUs that are associated or determine which PDUs or SDUs are associated, according to interlayer interactions or upper packet headers (e.g., SDAP packet header, PDCP packet header).

In some embodiments, after receiving the first indication information, the network device schedules or allocates resources to the terminal device according to the ADU association information in the first indication information, to ensure transmission of the associated ADUs. For example, a first uplink grant resource is transmitted to the terminal device. The size of the first uplink grant resource is greater than or equal to the size of the data amount of the associated ADUs; or, the first uplink grant resource meets the overall transmission of the associated ADUs in terms of a transmission delay and/or a bit error rate; or, at least one first uplink grant resource meets the overall transmission of the associated ADUs in terms of the transmission delay and/or bit error rate.

After receiving the first uplink grant resource, the terminal device generates a PDU. The first uplink grant resource may or may not meet the overall transmission of the associated ADUs. The terminal device may perform an LCP procedure and/or generate a MAC PDU according to one or more uplink grant resources allocated by the network device.

The operation of performing LCP procedure may include performing a first LCP procedure, and/or, modifying or adjusting the LCP procedure, such that the associated ADUs are included in the allocated first uplink grant resource. Specifically, a priority of an LCH corresponding to the associated ADUs may be modified or adjusted, or, a priority of an LCH group corresponding to the associated ADUs may be modified or adjusted, or, a priority of an LCH set corresponding to the associated ADUs may be modified or adjusted. In some embodiments, after performing the LCP procedure, the priority of the LCH corresponding to the associated ADU is higher than a priority corresponding to data of a packet or a Qos flow.

The generating a MAC PDU may include using a first MAC PDU generating rule, and/or, modifying or adjusting the MAC PDU generating rule, such that the associated ADUs are included in the allocated first uplink grant resource. Specifically, the size of the token bucket of an LCH corresponding to the associated ADUs may be modified or adjusted, the size of the token bucket of an LCH group corresponding to the associated ADUs may be modified or adjusted, the size of the token bucket of an LCH set corresponding to the associated ADUs may be modified or adjusted, the associated ADUs may be prioritized for multiplexing, the associated ADUs may be prioritized to be placed in the MAC PDU, etc. In some embodiments, after the generating a MAC PDU, the size of the token bucket of the LCH corresponding to the associated ADUs is greater than or equal to the size of the data amount of the associated ADUs, or, the size of the token bucket of the LCH group corresponding to the associated ADUs is greater than or equal to the size of the data amount of the associated ADUs, or, the size of the token bucket of the LCH set corresponding to the associated ADUs is greater than or equal to the size of the data amount of the associated ADUs.

Embodiment 2

When a PDCP layer of the terminal device generates a PDCP PDU, the ADU association information is carried in the packet header or within the packet for indicating the associated ADUs. For example, the terminal device may generate a packet according to the ADU association information, and may generate PDUs corresponding to the packet, with the PDUs including the ADU association information.

In some embodiments, the application layer of the terminal device indicates the ADU association to the access layer; the application layer buffers the associated ADUs; the application layer buffers the associated ADUs and then issues the associated ADUs to the access layer; an upper layer buffers the associated ADUs; the upper layer buffers the associated ADUs and then issues the associated ADUs to the access layer; a packet header of the upper layer includes an ADU association indication; the ADU association indication is configured to indicate to the PDCP layer of the network device whether the ADU association exists and/or the amount of to-be-transmitted data of the associated ADUs.

In some embodiments, the terminal device transmits data according to a resource configured or scheduled by the network device. For example, the terminal device receives a first uplink grant resource from the network device and transmits data to the network device according to the first uplink grant resource.

In some embodiments, the network device receives the data transmitted by the terminal device. Specifically, the network device processes the received PDCP PDUs. For example, a receiving end of the network device buffers the arrived ADUs according to the ADU association information; for example, after the associated ADUs arrive at the receiving end or are received by the receiving end, the associated ADUs are submitted to the upper layer. The receiving end may, for example, be a PDCP layer of the network device.

Embodiment 3

The terminal device receives a resource configured or scheduled by the network device, for example, a first uplink grant resource from the network device.

The terminal device transmits according to the first uplink grant resource, the first uplink grant resource being a new transmission resource.

In some embodiments, the terminal device determines whether to transmit a second indication information according to the ADU association information.

In some embodiments, the terminal device transmits the second indication information to the network device when a first condition is met. In some embodiments, the first condition includes at least one of the following: the size of the first uplink grant resource is less than the size of an associated packet; the MAC PDU does not include all the data of the associated packet; the MAC PDU does not include remaining data or to-be-transmitted data of the associated packet, and the associated ADUs do not meet a transmission delay requirement or a Packet Delay Budget (PDB) requirement; the size of the first uplink grant resource is less than the size of a token bucket corresponding to the associated ADUs; the size of the first uplink grant resource is less than the size of a token bucket corresponding to the LCH of the associated ADUs; the size of the first uplink grant resource is less than the size of a token bucket corresponding to the LCH pair of the associated ADUs; and the size of the first uplink grant resource is less than the size of a token bucket corresponding to the LCH group of the associated ADUs.

In some embodiments, the second indication information includes at least one of: an indication of ADU association; the size of data amount of ADU association; an indication of token bucket overflow; and the size of a remaining to-be-transmitted associated ADU.

In some embodiments, the second indication information is any one of: a second indication information of an LCH; a second indication information of an LCH pair; a second indication information of a DRB; a second indication information of an LCH group; and a second indication information of the terminal device.

In some embodiments, the second indication information is carried in the first uplink grant resource, or, the second indication information is carried in a second RRC message, or, the second indication information is carried in a second MAC CE, or, the second indication information is carried in a second layer signaling. In some embodiments, when the second indication information is carried in the second MAC CE, the second MAC CE is a BSR MAC CE or a new MAC CE. The priority of the new MAC CE may be higher than, equal to, or lower than the priority of the BSR MAC CE. In some embodiments, the priority of the new MAC CE is not lower than the priority of the BSR MAC CE.

In some embodiments, the first uplink grant resource or the MAC PDU associated with the first uplink grant resource includes data of some of the associated resources.

In some embodiments, the application layer of the terminal device indicates the ADU association to the access layer; the application layer buffers the associated ADUs; the application layer buffers the associated ADUs and then issues the associated ADUs to the access layer; an upper layer buffers the associated ADUs; the upper layer buffers the associated ADUs and then issues the associated ADUs to the access layer; a packet header of the upper layer includes an ADU association indication; the ADU association indication is configured to indicate to a lower layer (e.g., RLC layer, PDCP layer, or MAC layer) to indicate whether the ADU association exists and/or the amount of to-be-transmitted data of the associated ADUs.

In some embodiments, the network device schedules or allocates resources to the terminal device according to the second indication information, e.g., transmits a second uplink grant resource to the terminal device to ensure transmission of the associated ADUs. In some embodiments, the size of the second uplink grant resource is greater than or equal to the size of the data amount of the associated ADUs, or, the second uplink grant resource meets the overall transmission of the associated ADUs in terms of a transmission delay and/or a bit error rate, or, at least one second uplink grant resource meets the overall transmission of the associated ADUs in terms of the transmission delay and/or bit error rate.

Embodiment 4

The terminal device receives a resource configured or scheduled by the network device, for example, a first uplink grant resource from the network device.

The terminal device transmits according to the first uplink grant resource, the first uplink grant resource being a new transmission resource.

In some embodiments, the terminal device performs an LCP procedure or generating a MAC PDU through multiplexing and packet generating units according to the ADU association information.

In some embodiments, the generating a MAC PDU includes using a second MAC PDU generating rule, and/or, modifying or adjusting the MAC PDU generating rule. The using the second MAC PDU generating rule, and/or, modifying or adjusting the MAC PDU generating rule, includes at least one of the following: the MAC PDU is caused to exclude the data of the associated ADUs; a currently available token number Bj of the LCH or LCH group or LCH pair corresponding to the associated ADUs is set or modified (e.g., setting or modifying Bj to 0; or, setting or modifying Bj to be (Bj—the size of the associated packet); or, setting or modifying Bj to be (Bj—the size of amount of to-be-transmitted data of the associated packet), etc.); the LCH or LCH group or LCH pair corresponding to the associated ADU does not issue the PDUs corresponding to the associated ADUs.

In some embodiments, performing the second LCP procedure, and/or, modifying or adjusting the LCP procedure includes at least one of lowering the priority of the LCH or LCH group or LCH pair of the associated ADUs (e.g., the LCH or LCH group or LCH pair has the lowest priority); lowering a PBR of the LCH or LCH group or LCH pair of the associated ADUs (e.g., setting the PBR to 0).

In some embodiments, the terminal device performs the LCP procedure or generating a MAC PDU through multiplexing and packet generating units according to the ADU association information, when a second condition is met. In some embodiments, the second condition includes at least one of the following: the size of the first uplink grant resource is less than the size of an associated packet; the MAC PDU does not include all the data of the associated packet; the MAC PDU does not include remaining data or to-be-transmitted data of the associated packet; the MAC PDU does not include the remaining data or the to-be-transmitted data of the associated packet, and the associated ADUs do not meet a transmission delay or a PDB requirement.

In some embodiments, the terminal device transmits the generated MAC PDU to the network device.

In some embodiments, the MAC PDU includes a third indication information, and the third indication information is configured to indicate at least one of the following: the associated ADUs do not meet the transmission requirement; the associated resource or ADUs is not transmitted; the size of the associated resource or the size of ADUs; and the size of the amount of to-be-transmitted data of the associated resource or the size of the amount of to-be-transmitted data of ADUs.

In some embodiments, the third indication information is carried in a MAC CE or a Physical Uplink Shared Channel (PUSCH).

In some embodiments, according to the third indication information, the network device ensures that the allocated resources can meet the overall transmission of the associated ADUs during subsequent resource allocation. For example, the network device transmits a third uplink grant resource to the terminal device. In some embodiments, the size of the third uplink grant resource is greater than or equal to the size of the data amount of the associated ADUs; or, the third uplink grant resource meets the overall transmission of the associated ADUs in terms of a transmission delay and/or a bit error rate; or, at least one third uplink grant resource meets the overall transmission of the associated ADUs in terms of the transmission delay and/or bit error rate.

Embodiment 5

The terminal device receives a resource configured or scheduled by the network device, for example, a first uplink grant resource from the network device.

The terminal device transmits according to the first uplink grant resource, the first uplink grant resource being a new transmission resource.

In some embodiments, the terminal device performs a packet deletion according to the ADU association information, the packet deletion operation including at least one of the following operations: deleting data of the associated ADUs; deleting SDUs corresponding to the to-be-transmitted data; and deleting PDUs corresponding to the to-be-transmitted data.

In some embodiments, the MAC layer of the terminal device instructs an upper layer to delete the data of the associated ADUs; or, the MAC layer instructs the upper layer to delete the ADU corresponding to the to-be-transmitted data; or, the MAC layer instructs the upper layer to delete the PDU corresponding to the to-be-transmitted data.

In some embodiments, the terminal device performs the packet deletion when a second condition is met. In some embodiments, the second condition includes at least one of the following: the size of the first uplink grant resource is less than the size of an associated packet; the MAC PDU does not include all the data of the associated packet; the MAC PDU does not include remaining data or to-be-transmitted data of the associated packet; the MAC PDU does not include the remaining data or the to-be-transmitted data of the associated packet, and the associated ADUs do not meet a transmission delay or a PDB requirement. In some embodiments, the upper layer is a PDCP layer or an RLC layer.

In some embodiments, the MAC layer may indicate an associated ADU packet deletion to the network device for subsequent resource scheduling or adjustment by the network device. For example, the terminal device transmits a fourth indication information to the network device. In some embodiments, the fourth indication information indicates at least one of the following: the associated ADUs are deleted; the associated ADUs do not meet the transmission requirement; the associated ADUs or the associated resource of the associated ADUs are not transmitted; a size of the associated ADUs or a size of the associated resource of the associated ADUs; and the size of the amount of to-be-transmitted data of the associated ADUs.

In some embodiments, the fourth indication information is carried in a MAC CE or a PUSCH. The MAC CE may be, for example, a new MAC CE. When the fourth indication information is carried on a PUSCH, the fourth indication information may be carried in an L1 message, or in an RRC message.

Referring to FIG. 5, FIG. 5 is a structural schematic view I of a communication apparatus according to some embodiments of the present disclosure. As shown in FIG. 5, the communication apparatus 50 includes a transceiver module 51, configured to transmit first indication information to a network device; where the first indication information includes Application Data Unit (ADU) association information.

In some embodiments, the ADU association information includes at least one of the following:

an indication of ADU association;

a size of a data amount of ADU association;

an indication of token bucket overflow; and an association identifier and/or an association number.

In some embodiments, the ADU association information is any of the following:

ADU association information of a Logical Channel (LCH);

ADU association information of an LCH pair;

ADU association information of a Data Radio Bearer (DRB);

ADU association information of an LCH group; and

ADU association information of the terminal device.

In some embodiments, the transceiver module 51 transmits the first indication information to the network device when a trigger condition is met, the trigger condition including at least one of the following:

a token bucket overflow;

a token bucket overflow of a Logical Channel (LCH) corresponding to an ADU;

a token bucket overflow of an LCH group corresponding to an ADU;

a token bucket overflow of an LCH set corresponding to an ADU; and a size of a data amount of associated ADUs being greater than a size of a token bucket.

In some embodiments, at least one of the following is included:

the first indication information being carried in a first Radio Resource Control (RRC) message; the first indication information being carried in a first Medium Access Control Control Element (MAC CE); and the first indication information being carried in a first layer signaling.

In some embodiments, the first MAC CE is any of the following:

a BSR MAC CE; and a new MAC CE.

In some embodiments, the priority of the new MAC CE is the same as or higher than the priority of the BSR MAC CE.

In some embodiments, at least one of the following is included:

an application layer indicating ADU association to an access layer;

the application layer buffering associated ADUs;

the application layer buffering associated ADUs and issuing the associated ADUs to the access layer;

an upper layer buffering associated ADUs;

the upper layer buffering the associated ADUs and issuing the associated ADUs to the access layer;

an ADU association indication being comprised in a packet header of the upper layer; and the ADU association indication being configured to indicate to a lower layer whether the ADU association exists and/or an amount of to-be-transmitted data of the associated ADUs.

In some embodiments, the transceiver module 51 is further configured to: receive a first uplink grant resource from the network device.

In some embodiments, at least one of the following is included:

a size of the first uplink grant resource being greater than or equal to a size of a data amount of associated ADUs;

the first uplink grant resource meeting an overall transmission of the associated ADUs in terms of a transmission delay and/or a bit error rate; and at least one the first uplink grant resource meeting the overall transmission of the associated ADUs in terms of the transmission delay and/or the bit error rate.

In some embodiments, the transceiver module 101 is further configured to:

perform an LCP procedure and/or generate a MAC PDU according to the first uplink grant resource.

In some embodiments, the performing an LCP procedure and/or generating a MAC PDU includes at least one of the following:

using a first MAC PDU generating rule, and/or, modifying or adapting a MAC PDU generating rule; and performing a first LCP procedure, and/or, modifying or adjusting the LCP procedure.

In some embodiments, the using a first MAC PDU generating rule, and/or, modifying or adjusting a MAC PDU generating rule, includes at least one of the following:

modifying or adjusting a size of a token bucket of a Logical Channel (LCH) corresponding to associated ADUs;

modifying or adjusting a size of a token bucket of an LCH group corresponding to the associated ADUs;

modifying or adjusting a size of a token bucket of an LCH set corresponding to the associated ADUs;

prioritizing to multiplex the associated ADUs; and prioritizing placing the associated ADUs into a MAC PDU;

The performing a first LCP procedure, and/or, modifying or adjusting the LCP procedure, includes at least one of the following:

modifying or adjusting a priority of an LCH corresponding to the associated ADUs;

modifying or adjusting a priority of an LCH group corresponding to the associated ADUs; and modifying or adjusting a priority of an LCH set corresponding to the associated ADUs.

In some embodiments, at least one of the following is included:

the size of the token bucket of the LCH corresponding to the associated ADUs being greater than or equal to a size of a data amount of the associated ADUs;

the size of the token bucket of the LCH group corresponding to the associated ADUs being greater than or equal to the size of the data amount of the associated ADUs;

the size of the token bucket of the LCH set corresponding to the associated ADUs being greater than or equal to the size of the data amount of the associated ADUs; and the priority of the LCH corresponding to the associated ADUs being higher than a priority of an LCH corresponding to data of a packet or a Qos flow.

In some embodiments, at least one of the following is included:

the ADU association information being configured for an application layer to indicate ADU association to an access layer;

the ADU association information being configured for the application layer to buffer associated ADUs;

the ADU association information being configured for the application layer to issue the associated ADUs to the access layer after the application layer buffers the associated ADUs;

the ADU association information being configured for an upper layer to buffer the associated ADUs;

the ADU association information being configured for the upper layer to issue the associated ADUs to a lower layer after the upper layer buffers the associated ADUs; and the ADU association information being configured to indicate the ADU association information from the upper layer to the lower layer.

In some embodiments, the upper layer is at least one of the following:

an SDAP layer; and a PDCP layer.

The communication apparatus provided by the embodiments of the present disclosure may perform the technical solutions shown in the above method embodiments, which are similar in terms of realization principles as well as beneficial effects, and will not be described herein.

Referring to FIG. 6, FIG. 6 is a structural schematic view II of a communication apparatus according to some embodiments of the present disclosure. As shown in FIG. 6, the communication apparatus 60 includes the following: a transceiver module 61, configured to receive a first uplink grant resource from a network device; and a processing module 62, configured to perform a processing operation according to Application Data Unit (ADU) association information and the first uplink grant resource.

In some embodiments, the processing operation includes at least one of the following:

performing an LCP procedure;

packet deletion;

generating a MAC PDU;

transmitting data to the network device; and transmitting with the network device.

In some embodiments, the ADU association information includes at least one of the following:

an indication of ADU association;

a size of a data amount of ADU association;

an indication of a token bucket overflow; and an association identifier and/or an association number.

In some embodiments, the ADU association information is any of the following:

ADU association information of an LCH;

ADU association information of an LCH pair;

ADU association information of a DRB;

ADU association information of an LCH group;

ADU association information of a terminal device.

In some embodiments, the transceiver module 61 is further configured to: transmit first indication information to the network device, the first indication information including the ADU association information.

In some embodiments, the transceiver module 61 transmits the first indication information to the network device when a trigger condition is met, the trigger condition including at least one of the following:

a token bucket overflow;

a token bucket overflow of an LCH corresponding to an ADU;

a token bucket overflow of an LCH group corresponding to an ADU;

a token bucket overflow of an LCH set corresponding to an ADU; and a size of a data amount of associated ADUs being greater than a size of a token bucket.

In some embodiments, at least one of the following is included:

the first indication information is carried in a first RRC message;

the first indication information is carried in a first MAC CE; and the first indication information is carried in a first layer signaling.

In some embodiments, the first MAC CE is any one of the following:

a BSR MAC CE; and a new MAC CE.

In some embodiments, the priority of the new MAC CE is the same as or higher than the priority of the BSR MAC CE.

In some embodiments, at least one of the following is included:

an application layer indicates an ADU association to an access layer;

the application layer buffers the associated ADUs;

the application layer buffers the associated ADUs and then issues the associated ADUs to the access layer;

an upper layer buffers the associated ADUs;

the upper layer buffers the associated ADUs and then issues the associated ADUs to the access layer; an ADU association indication is included in a packet header of the upper layer;

the ADU association indication is configured to indicate to a lower layer whether the ADU association exists and/or the amount of to-be-transmitted data of the associated ADUs.

In some embodiments, the processing operation includes at least one of the following:

using a first MAC PDU generating rule, and/or, modifying or adjusting a MAC PDU generating rule; and performing a first LCP procedure, and/or, modifying or adjusting an LCP procedure.

In some embodiments, the using a first MAC PDU generating rule, and/or, modifying or adjusting a MAC PDU generating rule, includes at least one of the following:

modifying or adjusting the size of a token bucket of an LCH corresponding to the associated ADUs;

modifying or adjusting the size of a token bucket of an LCH group corresponding to the associated ADUs;

modifying or adjusting the size of a token bucket of an LCH set corresponding to the associated ADUs;

prioritizing to multiplex the associated ADUs; and prioritizing placing the associated ADUs into MAC PDUs.

The performing a first LCP procedure, and/or, modifying or adjusting the LCP procedure, includes at least one of the following:

modifying or adjusting a priority of an LCH corresponding to the associated ADUs;

modifying or adjusting a priority of an LCH group corresponding to the associated ADUs; and modifying or adjusting a priority of an LCH set corresponding to the associated ADUs.

In some embodiments, at least one of the following is included:

the size of the token bucket of the LCH corresponding to the associated ADUs being greater than or equal to a size of a data amount of the associated ADUs;

the size of the token bucket of the LCH group corresponding to the associated ADUs being greater than or equal to the size of the data amount of the associated ADUs;

the size of the token bucket of the LCH set corresponding to the associated ADUs being greater than or equal to the size of the data amount of the associated ADUs; and the priority of the LCH corresponding to the associated ADUs being higher than a priority of an LCH corresponding to data of a packet or a Qos flow.

In some embodiments, at least one of the following is included:

the ADU association information is configured for the application layer to indicate an ADU association to the access layer;

the ADU association information is configured for the application layer to buffer the associated ADUs; the ADU association information is configured for the application layer to issue the associated ADUs to the access layer after the application layer buffers the associated ADUs;

the ADU association information is configured for an upper layer to buffer the associated ADUs; the ADU association information is configured for the upper layer to issue the associated ADUs to a lower layer after the upper layer buffers the associated ADUs;

the ADU association information is configured for the upper layer to indicate the ADU association information from the upper layer to the lower layer.

In some embodiments, the upper layer is at least one of the following:

an SDAP layer; and a PDCP layer.

In some embodiments, the processing operation includes at least one of the following:

generating a Packet Data Unit (PDU) according to the ADU association information;

generating a PDU corresponding to the packet; the PDU includes the ADU association information, the ADU association information being configured to indicate associated ADUs;

transmitting the data to the network device according to the first uplink grant resource.

In some embodiments, an entity implementing the processing operation is a PDCP layer.

In some embodiments, the ADU association information is configured to indicate an ADU association or the associated ADUs to a lower layer.

In some embodiments, the ADU association information is configured for a MAC layer to process the associated ADUs.

In some embodiments, a packet header of the PDU or a PDCP PDU includes the ADU association information.

In some embodiments, at least one of the following is included:

an application layer indicates an ADU association to an access layer;

the application layer buffers the associated ADUs;

the application layer buffers the associated ADUs and then issues the associated ADUs to the access layer;

an upper layer buffers the associated ADUs;

the upper layer buffers the associated ADUs and then issues the associated ADUs to the access layer;

an ADU association indication is included in a packet header of the upper layer;

the ADU association indication is configured to indicate to a lower layer whether the ADU association exists and/or the amount of to-be-transmitted data of the associated ADUs.

In some embodiments, the upper layer is at least one of the following:

an SDAP layer; and a PDCP layer.

In some embodiments, the processing operation includes: transmitting a second indication information to the network device.

In some embodiments, the transceiver module transmits the second indication information to the network device when a first condition is met, the first condition including at least one of the following:

a size of the first uplink grant resource being less than a size of an associated data packet;

a Medium Access Control (MAC) Packet Data Unit (PDU) not comprising all data of the associated data packet;

the MAC PDU not comprising remaining data or to-be-transmitted data of the association data packet;

the MAC PDU not comprising the remaining data or to-be-transmitted data of the associated data packet, and associated ADUs not meeting a transmission delay requirement or a Packet Delay Budget (PDB) requirement;

the size of the first uplink grant resource being less than a size of a token bucket corresponding to the associated ADUs;

the size of the first uplink grant resource being less than a size of a token bucket corresponding to a Logical Channel (LCH) corresponding to the associated ADUs;

the size of the first uplink grant resource being less than a size of a token bucket corresponding to an LCH pair corresponding to the associated ADUs; and the size of the first uplink grant resource being less than a size of a token bucket corresponding to an LCH group corresponding to the associated ADUs.

In some embodiments, the second indication information includes at least one of the following: an indication of ADU association;

the size of data amount of ADU association;

an indication of token bucket overflow; and the size of a remaining to-be-transmitted associated ADU.

In some embodiments, the second indication information is any of the following:

second indication information of an LCH;

second indication information of an LCH pair;

second indication information of a DRB;

second indication information of an LCH group; and second indication information of a terminal device.

In some embodiments, at least one of the following is included:

the second indication information is carried in the first uplink grant resource;

the second indication information is carried in a second RRC message;

the second indication information is carried in a second MAC CE; and the second indication information is carried in a second layer signaling.

In some embodiments, the second MAC CE is any of the following:

a BSR MAC CE; and a new MAC CE.

In some embodiments, the priority of the new MAC CE is the same as or higher than the priority of the BSR MAC CE.

In some embodiments, the first uplink grant resource or a MAC Packet Data Unit (PDU) associated with the first uplink grant resource comprises data of a part of associated resources.

In some embodiments, the transceiver module 61 is further configured to: receive a second uplink grant resource from the network device.

In some embodiments, at least one of the following is included:

a size of the second uplink grant resource being greater than or equal to a size of a data amount of associated ADUs;

the second uplink grant resource meeting an overall transmission of the associated ADUs in terms of a transmission delay and/or a bit error rate;

at least one the second uplink grant resource meeting the overall transmission of the associated ADUs in terms of the transmission delay and/or the bit error rate.

In some embodiments, the processing operation includes at least one of the following:

using a second MAC PDU generating rule, and/or, modifying or adapting a MAC PDU generating rule; performing a second LCP procedure, and/or, modifying or adjusting an LCP procedure.

In some embodiments, the using a second MAC PDU generating rule, and/or, modifying or adapting a MAC PDU generating rule, includes at least one of the following:

the MAC PDU does not include the data of the associated ADUs;

a currently available token number Bj of the LCH or LCH group or LCH pair corresponding to the associated ADUs is set or modified; and the LCH or LCH group or LCH pair corresponding to the associated ADUs does not issue the PDUs corresponding to the associated ADUs.

The performing a second LCP procedure, and/or, modifying or adjusting an LCP procedure, including at least one of the following:

lowering the priority of the LCH or LCH group or LCH pair of the associated ADUs; and lowering a PBR of the LCH or LCH group or LCH pair of the associated ADUs.

In some embodiments, any one of the following is included:

the Bj being 0;

the Bj being Bj—a size of an associated packet; and the Bj being Bj—a size of amount of to-be-transmitted data of the associated packet.

In some embodiments, the terminal device meets a second condition, the second condition including at least one of the following:

a size of the first uplink grant resource being less than a size of an associated data packet;

a Medium Access Control (MAC) Packet Data Unit (PDU) not comprising all data of the associated data packet;

the MAC PDU not comprising remaining data or to-be-transmitted data of the association data packet;

the MAC PDU not comprising the remaining data or to-be-transmitted data of the associated data packet, and associated ADUs not meeting a transmission delay requirement or a Packet Delay Budget (PDB) requirement.

In some embodiments, the MAC PDU includes a third indication information, the third indication information being configured to indicate at least one of the following:

the associated ADUs do not meet the transmission requirement;

an associated resource or ADUs is not transmitted;

a size of the associated resource or a size of an ADU; and a size of an amount of to-be-transmitted data of the associated resource or a size of an amount of to-be-transmitted data of the ADU.

In some embodiments, the third indication information is carried in a MAC CE or PUSCH.

In some embodiments, the transceiver module 61 is further configured to:

receive a third uplink grant resource from the network device.

In some embodiments, the third uplink grant resource meets an overall transmission of the associated ADUs; at least one of the following is comprised:

a size of the third uplink grant resource being greater than or equal to a size of a data amount of the associated ADUs;

the third uplink grant resource meeting the overall transmission of the associated ADUs in terms of a transmission delay and/or a bit error rate; and at least one the third uplink grant resource meeting the overall transmission of the associated ADU in terms of the transmission delay and/or the bit error rate.

In some embodiments, the transceiver module 61 is further configured to: transmit a MAC PDU to the network device.

In some embodiments, the processing operation includes at least one of the following:

deleting data of the associated ADUs;

deleting SDUs corresponding to the to-be-transmitted data; and deleting PDUs corresponding to the to-be-transmitted data.

In some embodiments, at least one of the following is included:

the MAC layer instructs an upper layer to delete the data of the associated ADUs;

the MAC layer instructs the upper layer to delete the SDUs corresponding to the to-be-transmitted data; and the MAC layer instructing the upper layer to delete the PDUs corresponding to the to-be-transmitted data.

In some embodiments, the upper layer is at least one of the following:

a PDCP layer; and an RLC layer.

In some embodiments, the transceiver module 61 is further configured to: transmit fourth indication information to the network device.

In some embodiments, the fourth indication information is configured to indicate at least one of the following:

the associated ADUs are deleted;

the associated ADUs do not meet the transmission requirement;

the associated ADUs or the associated resource of the associated ADUs are not transmitted;

a size of the associated ADUs or a size of the associated resource of the associated ADUs; and the size of the amount of to-be-transmitted data of the associated ADUs.

In some embodiments, the fourth indication information is carried in a MAC CE or PUSCH.

In some embodiments, the first uplink grant resource meets an overall transmission of associated ADUs;

at least one of the following is comprised:

a size of the first uplink grant resource being greater than or equal to a size of a data amount of the associated ADUs;

the first uplink grant resource meeting the overall transmission of the associated ADUs in terms of a transmission delay and/or a bit error rate;

at least one the first uplink grant resource meeting the overall transmission of the associated ADUs in terms of the transmission delay and/or the bit error rate.

In some embodiments, the first uplink grant resource does not meet an overall transmission of associated ADUs;

at least one of the following is comprised:

a size of the first uplink grant resource being less than a size of a data amount of the associated ADUs;

the first uplink grant resource not meeting the overall transmission of the associated ADUs in terms of a transmission delay and/or a bit error rate; and at least one the first uplink grant resource not meeting the overall transmission of the associated ADUs in terms of the transmission delay and/or the bit error rate.

The communication apparatus provided by embodiments of the present disclosure may perform the technical solutions shown in the above method embodiments, which are similar in terms of realization principles as well as beneficial effects, and will not be described herein.

Referring to FIG. 7, FIG. 7 is a structural schematic view III of a communication apparatus according to some embodiments of the present disclosure. As shown in FIG. 7, the communication apparatus 70 the following: a transceiver module 71, configured to receive first indication information from a terminal device, the first indication information including Application Data Unit (ADU) association information.

In some embodiments, the ADU association information includes at least one of the following:

an indication of ADU association;

a size of data amount of the ADU association;

an indication of token bucket overflow; and an association identifier and/or an association number.

In some embodiments, the ADU association information is any of the following:

ADU association information of an LCH;

ADU association information of an LCH pair;

ADU association information of a DRB;

ADU association information of an LCH group;

ADU association information of the terminal device.

In some embodiments, at least one of the following is included:

the first indication information is carried in a first RRC message;

the first indication information is carried in a first MAC CE; and the first indication information is carried in a first layer signaling.

In some embodiments, the first MAC CE is any of the following:

a BSR MAC CE; and a new MAC CE.

In some embodiments, the priority of the new MAC CE is the same as or higher than the priority of the BSR MAC CE.

In some embodiments, the transceiver module 71 is further configured to: transmit a first uplink grant resource to the terminal device.

In some embodiments, at least one of the following is included:

a size of the first uplink grant resource being greater than or equal to a size of a data amount of associated ADUs;

the first uplink grant resource meeting an overall transmission of the associated ADUs in terms of a transmission delay and/or a bit error rate; and at least one the first uplink grant resource meeting the overall transmission of the associated ADUs in terms of the transmission delay and/or the bit error rate.

In some embodiments, at least one of the following is included:

the ADU association information is configured for the application layer to indicate an ADU association to the access layer;

the ADU association information is configured for the application layer to buffer the associated ADUs;

the ADU association information is configured for the application layer to issue the associated ADUs to the access layer after the application layer buffers the associated ADUs;

the ADU association information is configured for an upper layer to buffer the associated ADUs;

the ADU association information is configured for the upper layer to issue the associated ADUs to a lower layer after the upper layer buffers the associated ADUs; and the ADU association information is configured for the upper layer to indicate the ADU association information from the upper layer to the lower layer.

In some embodiments, the upper layer is at least one of the following:

an SDAP layer; and a PDCP layer.

The communication apparatus provided by the embodiments of the present disclosure may perform the technical solutions shown in the above method embodiments, which are similar in terms of realization principles as well as beneficial effects, and will not be described herein.

Referring to FIG. 8, FIG. 8 is a structural schematic view IV of a communication apparatus according to some embodiments of the present disclosure. As shown in FIG. 8, the communication apparatus 80 includes the following: a transceiver module 81, configured to transmit a first uplink grant resource to a terminal device.

In some embodiments, the transceiver module 81 is specifically configured to:

receive first indication information from the terminal device, the first indication information including Application Data Unit (ADU) association information; and transmit the first uplink grant resource to the terminal device according to the ADU association information.

In some embodiments, the ADU association information includes at least one of the following:

an indication of ADU association;

a size of data amount of the ADU association;

an indication of token bucket overflow; and an association identifier and/or an association number.

In some embodiments, the ADU association information is any of the following:

ADU association information of an LCH;

ADU association information of an LCH pair;

ADU association information of a DRB;

ADU association information of an LCH group;

ADU association information of a terminal device.

In some embodiments, at least one of the following is included:

the first indication information is carried in a first RRC message;

the first indication information is carried in a first MAC CE; and the first indication information is carried in a first layer signaling.

In some embodiments, the first MAC CE is any of the following:

a BSR MAC CE; and a new MAC CE.

In some embodiments, the priority of the new MAC CE is the same as or higher than the priority of the BSR MAC CE.

In some embodiments, the transceiver module 81 is further configured to: receive data from the terminal device, the data including data corresponding to the associated ADUs.

In some embodiments, the transceiver module 81 is specifically configured to at least one of the following:

buffering, by a receiving end, an arrived ADU according to the ADU association information; and delivering, by a receiving end, the associated ADUs to an upper layer after the associated ADUs arrive at or are received by the receiving end.

In some embodiments, the receiving end is a PDCP layer.

In some embodiments, the transceiver module 81 is specifically configured to: receive a second indication information from the terminal device.

In some embodiments, the second indication information includes at least one of the following:

an indication of ADU association;

the size of data amount of ADU association;

an indication of token bucket overflow; and the size of a remaining to-be-transmitted associated ADU.

In some embodiments, the second indication information is any of the following:

a second indication information of an LCH;

a second indication information of an LCH pair;

a second indication information of a DRB;

a second indication information of an LCH group; and a second indication information of a terminal device.

In some embodiments, at least one of the following is included:

the second indication information is carried in the first uplink grant resource;

the second indication information is carried in a second RRC message;

the second indication information is carried in a second MAC CE; and the second indication information is carried in a second layer signaling.

In some embodiments, the second MAC CE is any of the following:

a BSR MAC CE; and a new MAC CE.

In some embodiments, the priority of the new MAC CE is the same as or higher than the priority of the BSR MAC CE.

In some embodiments, the first uplink grant resource or a MAC Packet Data Unit (PDU) associated with the first uplink grant resource comprises data of a part of associated resources.

In some embodiments, the transceiver module 81 is further configured to: transmit a second uplink grant resource to the terminal device according to the second indication information.

In some embodiments, at least one of the following is included:

a size of the second uplink grant resource being greater than or equal to a size of a data amount of associated ADUs;

the second uplink grant resource meeting an overall transmission of the associated ADUs in terms of a transmission delay and/or a bit error rate;

at least one the second uplink grant resource meeting the overall transmission of the associated ADUs in terms of the transmission delay and/or the bit error rate.

In some embodiments, the transceiver module 81 is further configured to: receive a MAC PDU from the terminal device.

In some embodiments, the MAC PDU includes a third indication information, the third indication information being configured to indicate at least one of the following:

the associated ADUs do not meet the transmission requirement;

an associated resource or ADUs is not transmitted;

a size of the associated resource or a size of an ADU; and a size of an amount of to-be-transmitted data of the associated resource or a size of an amount of to-be-transmitted data of the ADU.

In some embodiments, the third indication information is carried in a MAC CE or PUSCH.

In some embodiments, the transceiver module 81 is further configured to: transmit a third uplink grant resource to the terminal device.

In some embodiments, the third uplink grant resource meets an overall transmission of the associated ADUs;

at least one of the following is comprised:

a size of the third uplink grant resource being greater than or equal to a size of a data amount of the associated ADUs;

the third uplink grant resource meeting the overall transmission of the associated ADUs in terms of a transmission delay and/or a bit error rate; and at least one the third uplink grant resource meeting the overall transmission of the associated ADU in terms of the transmission delay and/or the bit error rate.

In some embodiments, the transceiver module 81 is further configured to: receive a fourth indication information from the terminal device.

In some embodiments, the fourth indication information is configured to indicate at least one of the following:

the associated ADUs are deleted;

the associated ADUs do not meet the transmission requirement;

the associated ADUs or the associated resource of the associated ADUs are not transmitted;

a size of the associated ADUs or a size of the associated resource of the associated ADUs; and the size of the amount of to-be-transmitted data of the associated ADUs.

In some embodiments, the fourth indication information is carried in a MAC CE or PUSCH.

In some embodiments, the first uplink grant resource meets an overall transmission of associated ADUs;

at least one of the following is comprised:

a size of the first uplink grant resource being greater than or equal to a size of a data amount of the associated ADUs;

the first uplink grant resource meeting the overall transmission of the associated ADUs in terms of a transmission delay and/or a bit error rate;

at least one the first uplink grant resource meeting the overall transmission of the associated ADUs in terms of the transmission delay and/or the bit error rate.

In some embodiments, the first uplink grant resource does not meet an overall transmission of associated ADUs;

at least one of the following is comprised:

a size of the first uplink grant resource being less than a size of a data amount of the associated ADUs;

the first uplink grant resource not meeting the overall transmission of the associated ADUs in terms of a transmission delay and/or a bit error rate; and at least one the first uplink grant resource not meeting the overall transmission of the associated ADUs in terms of the transmission delay and/or the bit error rate.

The communication apparatus provided by the embodiments of the present disclosure may perform the technical solutions shown in the above method embodiments, which are similar in terms of realization principles as well as beneficial effects, and will not be described herein.

FIG. 9 is a structural schematic view of a terminal device according to some embodiments of the present disclosure. Referring to FIG. 9, the terminal device 90 may include: a transceiver 91, a memory 92, and a processor 93. The transceiver 91 may include: a transmitter and/or a receiver. The transmitter may also be referred to as a sender, a sending machine, a transmit port, or a transmit interface, and similar descriptions. The receiver may also be referred to as a receiving machine, a receive port, or a receive interface, and similar descriptions. Exemplarily, the transceiver 91, the memory 92, and the processor 93, are interconnected through a bus 94.

The memory 92 is configured to store program instructions.

The processor 93 is for performing the program instructions stored in the memory for causing the terminal device 90 to perform any of the communication methods above.

The receiver of the transceiver 91 may be configured to perform a receiving function of the terminal device in the above communication methods.

FIG. 10 is a structural schematic view of a network device according to some embodiments of the present disclosure. Referring to FIG. 10, the network device 100 may include: a transceiver 101, a memory 102, a processor 103. The transceiver 101 may include: a transmitter and/or a receiver. The transmitter may also be referred to as a sender, a sending machine, a transmit port, or a transmit interface, and similar descriptions. The receiver may also be referred to as a receiving machine, a receive port, or a receive interface, and similar descriptions. Exemplarily, the transceiver 101, the memory 102, and the processor 103, the parts are interconnected through a bus 104.

The memory 102 is configured to store program instructions.

The processor 103 is for performing the program instructions stored in the memory for causing the terminal device 100 to perform any of the communication methods above.

The receiver of the transceiver 101 may be configured to perform a receiving function of the network device in the above communication methods.

The embodiments of the present disclosure further provide a computer-readable storage medium, the computer-readable storage medium having computer-executable instructions stored therein, which are configured to implement the above communication methods when the computer-executable instructions are performed by a processor.

The embodiments of the present disclosure further provide a computer program product which may be performed by a processor, and which may be configured to realize the communication method performed by any of the terminal device or network device shown above when the computer program product is performed.

The communication apparatus, the computer-readable storage medium, and the computer program product in the embodiments of the present disclosure may perform the communication methods performed by the terminal device and the network device shown above, and the specific realization process and beneficial effects thereof are described above and will not be repeated herein.

In the several embodiments provided in the present disclosure, it should be understood that the disclosed systems, devices and methods, may be realized in other ways. For example, the device embodiments described above are merely schematic, e.g., the division of the units described, is merely a logical functional division, and the actual implementation may be divided in other ways, e.g., a plurality of units or components may be combined or may be integrated into another system, or some features may be ignored, or not implemented. At another point, the coupling or direct coupling or communication connection between each other shown or discussed may be an indirect coupling or communication connection through some interface, device, or unit, which may be electrical, mechanical, or otherwise.

The units illustrated as separated components may or may not be physically separated, and the components shown as units may or may not be physical units, i.e., they may be located in one place or they may be distributed over a plurality of network units. Some or all of these units may be selected to fulfill the purpose of the embodiments according to actual needs. In addition, the various functional units in various embodiments of the present disclosure may be integrated in a single processing unit, or each unit may be physically present separately, or two or more units may be integrated in a single unit. The above integrated units may be realized either in the form of hardware or in the form of software functional units.

It will be understood by those skilled in the art that all or some of the steps for realizing each of the foregoing embodiments of the method may be accomplished by hardware associated with program instructions. The aforementioned computer program may be stored in a computer-readable storage medium. The computer program, when performed by a processor, implements the steps including each of the above method embodiments; and the foregoing storage medium includes: a ROM, a RAM, a diskette, or a CD-ROM, and other kinds of media that can store program code.

Finally, it should be noted that the above embodiments are only intended to illustrate the technical solutions of the present disclosure, not to limit the same; although the present disclosure has been described in detail with reference to the foregoing embodiments, those skilled in the art should understand that it is still possible to make modifications to the technical solutions as recorded in the foregoing embodiments, or to make equivalent substitutions for some or all of the technical features therein; and such modifications or substitutions do not take the essence of the corresponding technical solutions out of the scope of the technical solutions in the embodiments of the present disclosure.

What is claimed is:

1. A communication method, performed by a terminal device and comprising:

receiving a first uplink grant resource from a network device; and performing a processing operation according to Application Data Unit (ADU) association information and the first uplink grant resource; wherein the ADU association information is ADU association information of a Logical Channel (LCH); and the processing operation comprises: modifying or adjusting a priority of an LCH corresponding to associated ADUs, and performing a Logical Channel Priority (LCP) procedure.

2. The method according to claim 1, wherein the processing operation further comprises at least one of:

performing packet deletion;

generating a Medium Access Control (MAC) Packet Data Unit (PDU);

transmitting data to the network device; and transmitting with the network device.

3. The method according to claim 1, further comprising:

transmitting first indication information to the network device; wherein the first indication information comprises the ADU association information.

4. The method according to claim 1, wherein the processing operation further comprises at least one of:

using a first Medium Access Control (MAC) Packet Data Unit (PDU) generating rule;

modifying or adjusting a MAC PDU generating rule; or performing a first LCP procedure.

5. The method according to claim 1, wherein the processing operation comprises at least one of:

generating a Packet Data Unit (PDU) according to the ADU association information;

generating a PDU corresponding to the packet; wherein the PDU comprises the ADU association information, and the ADU association information is configured to indicate associated ADUs; and transmitting data to the network device according to the first uplink grant resource.

6. The method according to claim 1, wherein the processing operation comprises:

transmitting indication information to the network device.

7. The method according to claim 6, wherein the indication information is transmitted to the network device in response to a first condition being met, the first condition comprising at least one of:

a size of the first uplink grant resource being less than a size of an associated data packet;

a Medium Access Control (MAC) Packet Data Unit (PDU) not comprising all data of the associated data packet;

the MAC PDU not comprising remaining data or to-be-transmitted data of the association data packet;

the MAC PDU not comprising the remaining data or to-be-transmitted data of the associated data packet, and associated ADUs not meeting a transmission delay requirement or a Packet Delay Budget (PDB) requirement;

the size of the first uplink grant resource being less than a size of a token bucket corresponding to the associated ADUs;

the size of the first uplink grant resource being less than a size of a token bucket corresponding to a Logical Channel (LCH) corresponding to the associated ADUs;

the size of the first uplink grant resource being less than a size of a token bucket corresponding to an LCH pair corresponding to the associated ADUs; and the size of the first uplink grant resource being less than a size of a token bucket corresponding to an LCH group corresponding to the associated ADUs.

8. The method according to claim 6, further comprising: receiving a second uplink grant resource from the network device.

9. The method according to claim 1, wherein the processing operation comprises at least one of:

using a second Medium Access Control (MAC) Packet Data Unit (PDU) generating rule;

modifying or adapting a MAC PDU generating rule;

performing a second LCP procedure; or modifying or adjusting an LCP.

10. The method according to claim 1, wherein the processing operation comprises at least one of:

deleting data of associated ADUs;

deleting a Service Data Unit (SDU) corresponding to to-be-transmitted data; and deleting a Packet Data Unit (PDU) corresponding to the to-be-transmitted data.

11. The method according to claim 1, wherein the performing the processing operation according to the ADU association information and the first uplink grant resource comprises:

in response to the first uplink grant resource meeting an overall transmission of associated ADUs, transmitting data of the associated ADUs to the network device according to the first uplink grant resource; wherein that the first uplink grant resource meets the overall transmission of the associated ADUs comprises at least one of the following:

a size of the first uplink grant resource being greater than or equal to a size of a data amount of the associated ADUs;

the first uplink grant resource meeting the overall transmission of the associated ADUs in terms of a transmission delay and/or a bit error rate; and at least one of the first uplink grant resource meeting the overall transmission of the associated ADUs in terms of the transmission delay and/or the bit error rate; and that the first uplink grant resource does not meet the overall transmission of the associated ADUs comprises at least one of the following:

a size of the first uplink grant resource being less than a size of a data amount of the associated ADUs;

the first uplink grant resource not meeting the overall transmission of the associated ADUs in terms of a transmission delay and/or a bit error rate; and at least one of the first uplink grant resource not meeting the overall transmission of the associated ADUs in terms of the transmission delay and/or the bit error rate.

12. The method according to claim 1, wherein the ADU association information is configured to indicate association relationship between at least two ADUs at an application layer.

13. The method according to claim 1, wherein the modifying or adjusting the LCP is temporary.

14. The method according to claim 1, wherein at least one of the following is comprised:

the ADU association information is configured to indicate associated ADUs;

the ADU association information being configured for an application layer to indicate ADU association to an access layer;

the ADU association information being configured for the application layer to buffer the associated ADUs;

the ADU association information being configured for the application layer to issue the associated ADUs to the access layer after the application layer buffers the associated ADUs;

the ADU association information being configured for an upper layer to buffer the associated ADUS;

the ADU association information being configured for the upper layer to issue the associated ADUs to a lower layer after the upper layer buffers the associated ADUs; or the ADU association information being configured to indicate the ADU association information from the upper layer to the lower layer.

15. The method according to claim 14, wherein the upper layer is at least one of the following:

a Service Data Adaptation Protocol (SDAP) layer; and a Packet Data Convergence Protocol (PDCP) layer.

16. The method according to claim 1, wherein the priority of the LCH corresponding to the associated ADUs being higher than a priority of an LCH corresponding to data.

* * * * *